US010717028B2

(12) United States Patent
Greco et al.

(10) Patent No.: US 10,717,028 B2
(45) Date of Patent: Jul. 21, 2020

(54) LIQUID FILTER ASSEMBLY AND METHODS

(71) Applicant: Donaldson Company, Inc., Minneapolis, MN (US)

(72) Inventors: Enrico Greco, Villa Poma (IT); Francesco Marangoni, Lendinara (IT)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 16/241,255

(22) Filed: Jan. 7, 2019

(65) Prior Publication Data
US 2019/0134544 A1 May 9, 2019

Related U.S. Application Data

(63) Continuation of application No. 14/781,492, filed as application No. PCT/US2014/032700 on Apr. 2, 2014, now Pat. No. 10,173,153.

(60) Provisional application No. 61/909,619, filed on Nov. 27, 2013, provisional application No. 61/808,077, filed on Apr. 3, 2013.

(51) Int. Cl.
*B01D 35/147* (2006.01)
*B01D 35/027* (2006.01)
*B01D 29/23* (2006.01)

(52) U.S. Cl.
CPC .......... *B01D 35/147* (2013.01); *B01D 29/23* (2013.01); *B01D 29/232* (2013.01); *B01D 35/0276* (2013.01); *B01D 2201/295* (2013.01); *B01D 2201/347* (2013.01)

(58) Field of Classification Search
CPC ........ B01D 2201/291; B01D 2201/295; B01D 2201/296; B01D 2201/347; B01D 29/23; B01D 29/232; B01D 35/0276; B01D 35/147; B01D 2201/4046; B01D 46/2414
See application file for complete search history.

(56) References Cited

U.S. PATENT DOCUMENTS 4,172,709 A * 10/1979 Kippel .............. A61M 16/1055
96/416
6,652,614 B2 * 11/2003 Gieseke ............. B01D 46/0004
55/482
8,177,976 B2   5/2012 Formica
(Continued)

FOREIGN PATENT DOCUMENTS

CN      101370563 A    2/2009
DE      10107466 A1    8/2002
(Continued)

OTHER PUBLICATIONS

Office Action of Japanese Patent Application No. 2016-506587 dated Nov. 13, 2017, 3 pages.
(Continued)

*Primary Examiner* — Terry K Cecil
(74) *Attorney, Agent, or Firm* — Merchant & Gould P.C.

(57) ABSTRACT

A liquid filter assembly includes a porous tubular support member and a filter element removably and replaceably oriented in the interior volume of the support member. A bypass valve arrangement is provided to permit at least some unfiltered liquid to bypass media in the filter element. A dynamic seal can help to seal the bypass valve arrangement.

13 Claims, 22 Drawing Sheets

(56) References Cited

U.S. PATENT DOCUMENTS

| | | | |
|---|---|---|---|
| 8,475,556 B2 * | 7/2013 | Kori | B01D 46/0024 55/482 |
| 2002/0027100 A1 | 3/2002 | Gershenson | |

FOREIGN PATENT DOCUMENTS

| | | |
|---|---|---|
| JP | 50118370 A | 9/1975 |
| JP | 52150078 A | 12/1977 |
| JP | 55126915 A | 10/1980 |
| JP | 56159111 U | 11/1981 |
| JP | 58119817 U | 8/1983 |
| WO | 9919043 A2 | 4/1999 |
| WO | 2005063358 A2 | 7/2005 |
| WO | 2007011223 A2 | 1/2007 |
| WO | 2007059238 A2 | 5/2007 |
| WO | 2008030323 A1 | 3/2008 |
| WO | 2012077048 A1 | 6/2012 |

OTHER PUBLICATIONS donaldson.com; HPK04, Catalog pp. 121-125-128-and-129.
Third Office Action with English Translation of Chinese Application No. 201480024791.X dated Jan. 2, 2018, 11 pages.
Search Report for Brazil Application No. BR112015025411-0 dated Nov. 19, 2019, 3 pages.
Office Action for Japanese Application No. 2016-506587 dated Oct. 19, 2018, 3 pages.
Examination Report for European Application No. 14 723 238.3 dated Jan. 2, 2019, 7 pages.
Examination Report for European Application No. 14 723 238.3 dated Oct. 30, 2019, 6 pages.

* cited by examiner

LIQUID FILTER ASSEMBLY AND METHODS

This application is a continuation of U.S. application Ser. No. 14/781,492, filed Sep. 30, 2015 which is a U.S. National Stage application of PCT International Patent application No. PCT/US2014/032700, filed 2 Apr. 2014 which claims priority to U.S. Provisional patent application Ser. No. 61/808,077, filed Apr. 3, 2013, and U.S. Provisional patent application Ser. No. 61/909,619, filed Nov. 27, 2013 which applications are incorporated herein by reference. To the extent appropriate, a claim of priority is made to each of the above disclosed applications.

This disclosure concerns filter assemblies, components, e.g. filter elements, and methods for filtration of liquid, such as oil, including hydraulic oil.

In-tank filter systems include filter assemblies configured to be mounted on a reservoir tank for the liquid involved. The assembly typically provide for at least one of liquid flow to the tank, or a drawing of liquid from the tank. Some of the filter assemblies used in these systems are complex.

Object of the present invention is to provide improved filter assemblies, filter elements and filtering methods, in particular by solving the issues of complexity of the prior art systems.

This object is solved by the independent claims.

In the following, preferred embodiments of the present invention are described. In one preferred embodiment, a liquid filter assembly is provided. The assembly can include a housing arrangement including a surrounding wall defining a housing interior, an inlet, and an outlet; a porous tubular support member operably oriented in the housing interior; the support member having an interior volume; and a filter element removably and replaceably oriented in the interior volume of the support member.

In another preferred embodiment, the filter element can include a tubular media pack defining a media interior; the media pack can be secured to a closed end cap and an open end cap; the filter element being arranged relative to the housing arrangement to receive unfiltered liquid from the housing inlet, into the media interior and then allow the unfiltered liquid to flow through the media pack and then through the support member to a filtered liquid volume outside of the interior volume of the support member, and then through the housing outlet.

In another preferred embodiment, a bypass valve arrangement can be provided. The bypass valve arrangement can be constructed and arranged to permit at least some unfiltered liquid to bypass the media pack and flow into the filtered liquid volume outside of the support member; the bypass valve arrangement can include a valve head and a valve seat; when the valve head is moved out of sealing engagement with the valve seat, a bypass opening allows flow of unfiltered liquid into the filtered liquid volume, when the valve head in in sealing engagement with the valve seat, the bypass opening is closed, preventing unfiltered liquid from bypassing the media pack.

In another preferred embodiment, a dynamic seal can be provided. The dynamic seal is engaged as the valve head moves into and out of sealing engagement.

In another preferred embodiment, the bypass valve arrangement can include a bias member seat attached to the support member; and a biasing member operably held by the bias member seat. The valve head can be within the bias member seat and engaged against the biasing member; and the valve seat can be secured to the housing arrangement and being in removable sealing engagement with the valve head.

In another preferred embodiment, the dynamic seal can include a seal member held by the filter element.

In another preferred embodiment, the seal member may comprise an o-ring seal member held by the open end cap and dynamically sealed against a sealing surface of the valve head.

In another preferred embodiment, the dynamic seal may include a seal member held by the valve head.

In another preferred embodiment, the bias member seat can include an outer tube and an inner tube; the outer tube surrounding and being radially spaced from at least a portion of the valve head.

In another preferred embodiment, the biasing member may be oriented between an inside of the outer tube of the bias member seat and an outside of the valve head.

In another preferred embodiment, the valve head can include a stepped ring; an inside surface of the stepped ring holding the dynamic seal and forming the dynamic sealing engagement with the inner tube of the bias member seat.

In another preferred embodiment, the media pack can extend between the closed end cap and open end cap.

In another preferred embodiment, the housing arrangement can include a removable cover to provide access to the housing interior.

In another preferred embodiment, the biasing member can comprise a wave spring.

In another preferred embodiment, the closed end cap may include an exterior portion and an opposite interior portion; the interior portion being in communication with the media interior; the exterior portion of the closed end cap having a bulge that extends away from a remaining portion of the filter element and beyond the second end of the media pack.

In another preferred embodiment, the support member can be rigid.

In another preferred embodiment a liquid filter assembly can include a housing arrangement including a surrounding wall defining a housing interior, an inlet, and an outlet.

In another preferred embodiment, a porous tubular support member can be operably oriented in the housing interior, and the support member will have an interior volume.

In another preferred embodiment, a filter element can be removably and replaceably oriented in the interior volume of the support member. The filter element may include a tubular media pack defining a media interior, the media pack being secured to a closed end cap and an open end cap. The filter element can include a seal member. The filter element can be arranged relative to the housing arrangement to receive unfiltered liquid from the housing inlet, into the media interior, and then allow the unfiltered liquid to flow through the media pack and then through the support member to a filtered liquid volume outside of the interior volume of the support member, and then through the housing outlet.

In another preferred embodiment, the bypass valve arrangement can be constructed and arranged to permit at least some unfiltered liquid to bypass the media pack and flow into the filtered liquid volume outside of the support member. The bypass valve arrangement can include a bias member seat attached to the support member; a biasing member operably held by the bias member seat; a valve head within the bias member seat and engaged against the biasing member; and a valve seat secured to the housing arrangement and in removable sealing engagement with the valve head such that when the valve head is moved out of sealing engagement with the valve seat, its bypass opening allows flow of unfiltered liquid into the filtered liquid volume, and when the valve head is in sealing engagement with the valve seat, the bypass opening is closed, preventing unfiltered liquid from bypassing the media pack.

In another preferred embodiment, the valve head can have a sealing surface. The filter element seal member can be sealed against the sealing surface.

In another preferred embodiment a liquid filter assembly can also include a filter member that includes a seal member forming a seal against the support member.

In another preferred embodiment, the bypass valve arrangement can include a bias member seat attached to the housing arrangement; a biasing member operably held by the bias member seat; a valve head within the bias member seat and engaged against the biasing member; and a valve seat secured to the support member and being in removable sealing engagement with the valve head such that when the valve head is moved out of sealing engagement with the valve seat, its bypass opening allows flow of unfiltered liquid into the filter liquid volume, and when the valve head is in sealing engagement with the valve seat, the bypass opening is closed, preventing unfiltered liquid from bypassing the media pack. In another preferred embodiment, the media pack can extend between the closed end cap and the open end cap.

In another preferred embodiment, the filter element seal member may comprise an O-ring seal member held by the open end cap.

In another preferred embodiment, a bypass valve seal member can be operably held by the valve seat.

In another preferred embodiment, the valve head can include a stepped ring.

In another preferred embodiment, the valve head can include a stepped ring having an axial end. The axial end can be in sealing engagement against the bypass seal member when the bypass opening is closed. The axial end can be spaced away from the bypass seal member when the bypass opening is opened.

In another preferred embodiment, the housing arrangement can include a removable cover to provide access to the housing interior.

In another preferred embodiment, the bias member seat may comprise a tube surrounding and being radially spaced from at least a portion of the filter element and the valve head.

In another preferred embodiment, the biasing member can be oriented between an inside of the tube of the bias member seat at an outside of the valve head.

In another preferred embodiment, the valve head can comprise a stepped ring, with an inside surface of the stepped ring forming the sealing surface.

In another preferred embodiment, the filter element seal member can comprise an O-ring seal member held by the open end cap and sealed against the valve head sealing surface.

In another preferred embodiment, the biasing member can be engaged against the step in the stepped ring.

In another preferred embodiment, the stepped ring can have an axial end. The axial end can be in sealing engagement against the valve seat when the bypass opening is closed. The axial end can be spaced away from the valve seat when the bypass opening is opened.

In another preferred embodiment, a bypass valve seal member can be operably held by the valve seat. The axial end of the stepped ring can move into and out of engagement with the bypass valve seal member to close and open the bypass opening.

In another preferred embodiment, the housing surrounding wall can have an inwardly extending shelf.

In another preferred embodiment, the valve seat can be secured to the housing at the inwardly extending shelf.

In another preferred embodiment, the bias member seat can comprise an outer tube and an inner tube. The outer tube can surround and be radially spaced from at least a portion of the valve head.

In another preferred embodiment, the biasing member can be oriented between an inside of the outer tube of the bias member seat and an outside of the valve head.

In another preferred embodiment, the valve head can comprise a stepped ring. An inside surface of the stepped ring can be in sealing engagement with the inner tube of the bias member seat.

In another preferred embodiment, the biasing member can be engaged against the step in the ring.

In another preferred embodiment, the valve seat can include a band surrounding at least a portion of the support tube.

In another preferred embodiment, the housing surrounding wall can have an inwardly extending shelf, and the bias member seat can be secured to the housing at the shelf.

In another preferred embodiment, the media pack can have an outside diameter which is less than an outside diameter of an o-ring seal member on the element.

In another preferred embodiment, the media pack can have an outside diameter which is greater than an inside diameter of the o-ring seal member on the element.

In another preferred embodiment, the media pack can have an outside diameter which is less than an outside diameter of an o-ring seal member on the element and greater than an inside diameter of the o-ring seal member on the element.

In another preferred embodiment a method of filtering can include providing a housing arrangement including a surrounding wall defining a housing interior, an inlet, and an outlet. A rigid porous tubular support member can be operably oriented in the housing interior. The support member can have an interior volume. A filter element can be removably and replaceably oriented in the interior volume of the support member. The filter element can include a tubular media pack defining a media interior. The media pack can be secured to a closed end cap and an open end cap. The filter element can include a seal member.

In another preferred embodiment, the method can include directing unfiltered liquid to flow into the housing inlet, and into the media interior. In another preferred embodiment, the method can include filtering the unfiltered liquid by directing the liquid to flow through the media pack and then through the support member to a filtered liquid volume outside of the interior volume of the support member, and then through the housing outlet.

In another preferred embodiment, the method can include opening a bypass valve arrangement when restriction across the media pack reaches a predetermined level. The step of opening the bypass valve arrangement will permit at least some unfiltered liquid to bypass the media pack and flow into the filtered liquid volume outside of the support member.

In another preferred embodiment, the bypass valve arrangement, in the method, can include a bias member seat; a biasing member operably held by the bias member seat; a valve head within the bias member seat and engaged against the biasing member; and a valve seat in removable sealing engagement with the valve head, such that when restriction across the media pack reaches a predetermined level, the valve head is moved out of sealing engagement with the valve seat, opening a bypass opening to allow flow of unfiltered liquid into the filtered liquid volume.

In another preferred embodiment, in the method, the bias member seat can be attached to the support member.

In another preferred embodiment, in the method, the bias member seat can be attached to the housing arrangement.

In another preferred embodiment, in the method, the valve head can have a sealing surface, and the filter element seal member can be sealed against the sealing surface.

In another preferred embodiment, in the method, the filter element can include a seal member that forms a seal against the support member.

In another preferred embodiment, in the method, the valve seat can be secured to the housing arrangement.

In another preferred embodiment, in the method, the valve seat can be secured to the support member.

In another preferred embodiment a filter element is provided comprising a tubular media pack defining a media interior and having opposite first and second ends; an open end cap secured to the media pack at the second end; a closed end cap secured to the media pack at the second end; and a seal member supported by the open end cap, the seal member configured to dynamically seal against a portion of an assembly, when the filter element is operably installed with the assembly.

In another preferred embodiment, the seal member may comprise an o-ring seal member.

In another preferred embodiment, the media pack has an outside diameter which can be less than an outside diameter of the o-ring seal member.

In another preferred embodiment, the media pack has an outside diameter which can be greater than an inside diameter of the o-ring seal member. In another preferred embodiment, the closed end cap can include an exterior portion and an opposite interior portion; the interior portion being in communication with the media interior; the exterior portion of the closed end cap may have a bulge that extends away from a remaining portion of the filter element and beyond the second end of the media pack.

In another preferred embodiment, the interior portion of the closed end cap can define a concave receptacle.

In another preferred embodiment, a liquid filter assembly comprises:
(a) a head arrangement including an inlet;
(b) a porous tubular support member directly or indirectly supported by the head arrangement; the support member having an interior volume;
(c) a filter element removably and replaceably oriented in the interior volume of the support member; the filter element including a tubular media pack defining a media interior; the media pack being secured to a closed end cap and an open end cap; the filter element including a seal member;
  (i) the filter element being arranged relative to the head arrangement to receive unfiltered liquid from the head inlet, into the media interior and then allow the liquid to flow through the media pack and then through the support member to a filtered liquid volume outside of the interior volume of the support member;
(d) a bypass valve arrangement constructed and arranged to permit, in response to pressure within the media interior exceeding a predetermined threshold, at least some unfiltered liquid to bypass the media pack and flow into the filtered liquid volume outside of the support member; the bypass valve arrangement including:
  (i) a bias member seat disposed between the inlet and the filter element;
  (ii) a biasing member directly or indirectly supported by the bias member seat;
  (iii) a valve head engaged against the biasing member;
    (A) the valve head having a sealing surface; the filter element seal member being sealed against the sealing surface; and
  (iv) a valve seat secured to the head arrangement and being in removable sealing engagement with the valve head, such that:
    (A) when the valve head is moved out of sealing engagement with the valve seat, a bypass opening allows flow of unfiltered liquid into the filtered liquid volume, and
    (B) when the valve head in in sealing engagement with the valve seat, the bypass opening is closed, preventing unfiltered liquid from bypassing the media pack.

In another preferred embodiment, a liquid filter assembly comprises:
(a) a head arrangement including an inlet;
(b) a porous tubular support member directly or indirectly supported by the head arrangement; the support member having an interior volume;
(c) a filter element removably and replaceably oriented in the interior volume of the support member; the filter element including a tubular media pack defining a media interior; the media pack being secured to a closed end cap and an open end cap;
  (i) the filter element including a seal member forming a seal against the support member;
  (ii) the filter element being arranged relative to the head arrangement to receive unfiltered liquid from the head inlet, into the media interior and then allow the liquid to flow through the media pack and then through the support member to a filtered liquid volume outside of the interior volume of the support member;
(d) a bypass valve arrangement constructed and arranged to permit, in response to pressure within the media interior exceeding a predetermined threshold, at least some unfiltered liquid to bypass the media pack and flow into the filtered liquid volume outside of the support member; the bypass valve arrangement including:
  (i) a bias member seat disposed between the inlet and the filter element;
  (ii) a biasing member directly or indirectly supported by the bias member seat;
  (iii) a valve head engaged against the biasing member; and
  (iv) a valve seat secured to the support member and being in removable sealing engagement with the valve head, such that:
    (A) when the valve head is moved out of sealing engagement with the valve seat, a bypass opening allows flow of unfiltered liquid into the filtered liquid volume, and
    (B) when the valve head in in sealing engagement with the valve seat, the bypass opening is closed, preventing unfiltered liquid from bypassing the media pack.

In another preferred embodiment, the media pack extends between the closed end cap and open end cap.

In another preferred embodiment, the filter element seal member comprises an o-ring seal member held by the open end cap.

In another preferred embodiment, a bypass valve seal member operably held by the valve seat.

In another preferred embodiment, the valve head includes a stepped ring.

In another preferred embodiment, the valve head includes a stepped ring having an axial end; the axial end being in sealing engagement against the bypass seal member when the bypass opening is closed; the axial end being spaced away from the bypass seal member when the bypass opening is opened.

In another preferred embodiment, the head arrangement includes a removable cover.

In another preferred embodiment, the bias member seat comprises a tube surrounding and being radially spaced from at least a portion of the filter element and the valve head.

In another preferred embodiment, the biasing member is oriented between an inside of the tube of the bias member seat and an outside of the valve head.

In another preferred embodiment, the valve head comprises a stepped ring; an inside surface of the stepped ring forming the sealing surface. In another preferred embodiment, the filter element seal member comprises an o-ring seal member held by the open end cap and sealed against the valve head sealing surface.

In another preferred embodiment, the biasing member is engaged against the step in the ring.

In another preferred embodiment, the stepped ring has an axial end; the axial end being in sealing engagement against the valve seat when the bypass opening is closed; the axial end being spaced away from the valve seat when the bypass opening is opened.

In another preferred embodiment, a bypass valve seal member operably held by the valve seat; and wherein the axial end of the stepped ring moves into and out of engagement with the bypass valve seal member to close and open the bypass opening.

In another preferred embodiment, the bias member seat comprises an outer tube and an inner tube; the outer tube surrounding and being radially spaced from at least a portion of the valve head.

In another preferred embodiment, the biasing member is oriented between an inside of the outer tube of the bias member seat and an outside of the valve head.

In another preferred embodiment, the valve head comprises a stepped ring; an inside surface of the stepped ring forming sealing engagement with the inner tube of the bias member seat.

In another preferred embodiment, the biasing member is engaged against the step in the ring.

In another preferred embodiment, the stepped ring has an axial end; the axial end being in sealing engagement against the valve seat when the bypass opening is closed; the axial end being spaced away from the valve seat when the bypass opening is opened.

In another preferred embodiment, a bypass valve seal member operably held by the valve seat; and wherein the axial end of the stepped ring moves into and out of engagement with the bypass valve seal member to close and open the bypass opening.

In another preferred embodiment, the valve seat includes a band surrounding at least a portion of the support member.

In another preferred embodiment, the biasing member comprises a wave spring.

In another preferred embodiment, the closed end cap includes an exterior portion and an opposite interior portion; the interior portion being in communication with the media interior; the exterior portion of the closed end cap having a bulge that extends away from a remaining portion of the filter element and beyond the second end of the media pack.

A variety of examples of desirable product features or methods are set forth in part in the description that follows, and in part will be apparent from the description, or may be learned by practicing various aspects of this disclosure. The aspects of the disclosure may relate to individual features as well as combinations of features. It is to be understood that both the forgoing general description and the following detailed description are explanatory only, and are not restrictive of the claimed invention.

DETAILED DESCRIPTION

Figure 1:
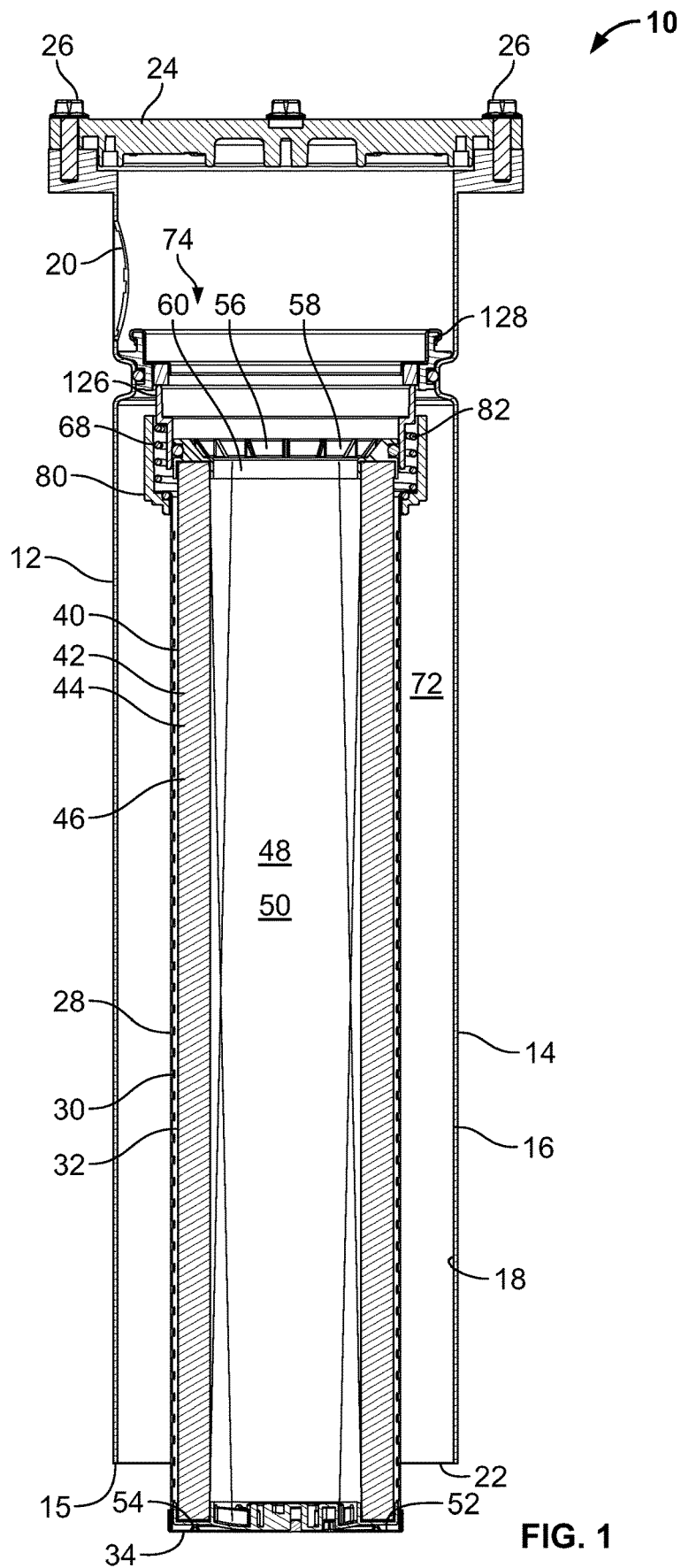
FIG. 1 is a cross-sectional view of a portion of a liquid filter assembly having a filter element operably installed therein, constructed in accordance with principles of this disclosure.

Described are example embodiments of components that can be useful in liquid filter assemblies to improve the prior art. Where appropriate, like parts will have the same reference numerals.

Figure 5:
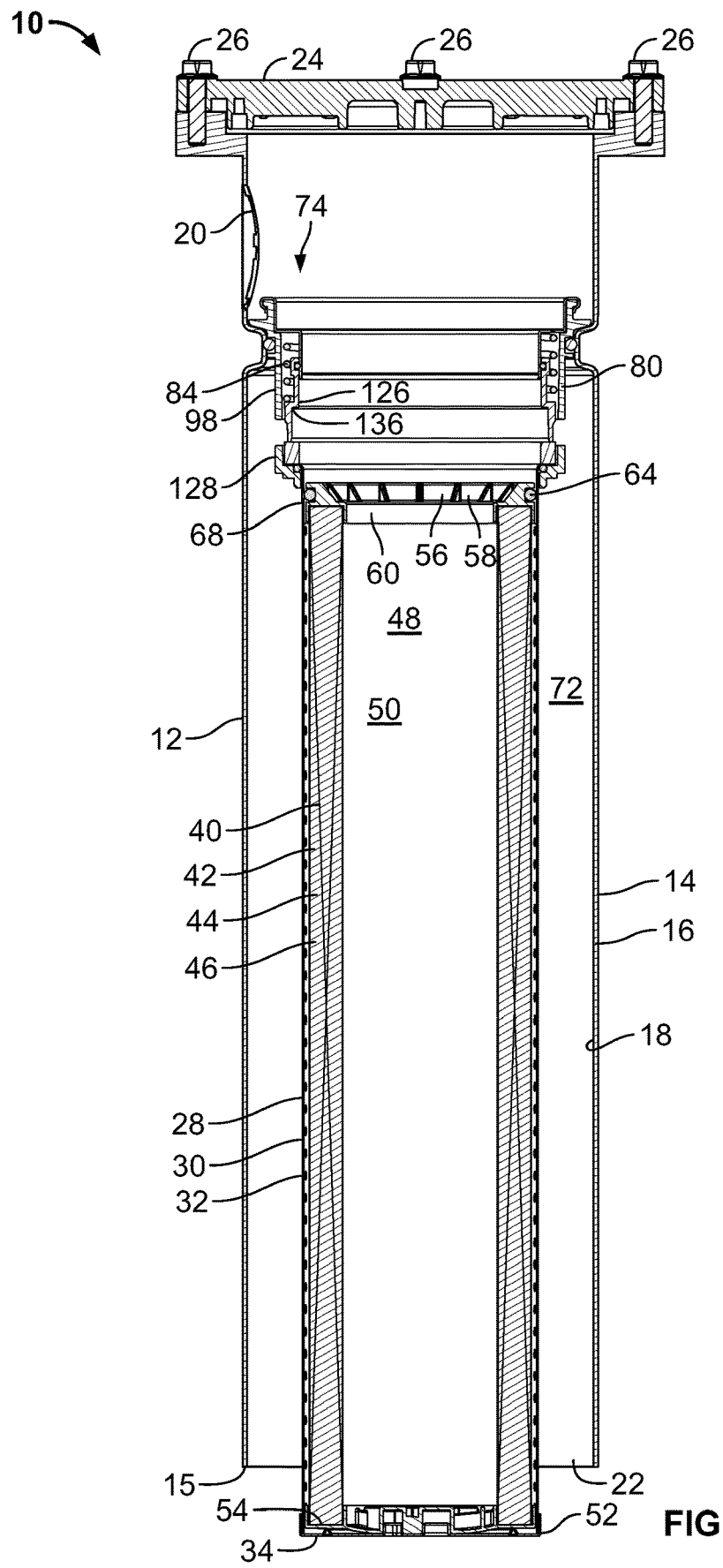
FIG. 5 is a cross-sectional view of a portion of a filter assembly, constructed in accordance with principles of this disclosure.

In FIGS. 1 and 5, a liquid filter assembly is shown generally at 10. The liquid filter assembly 10 is useful for filtering fluids, such as oil, including hydraulic oil. The filter assembly 10 can be used for filtration of other liquids, as well.

The liquid filter assembly 10 includes a housing arrangement 12. The housing arrangement 12 includes a housing 14. The housing 14 can include a surrounding wall 16. The surrounding wall 16 defines within it a housing interior 18.

The housing arrangement 12 includes an inlet 20. The inlet 20 can be for conveying unfiltered fluid, such as unfiltered liquid, such as unfiltered oil.

The housing arrangement 12 can include an outlet 22. The outlet 22 will be for conveying fluid that has entered into the inlet 20. Typically, the fluid conveyed through the outlet 22 will be filtered liquid. In some systems, including in-tank systems 5 (discussed below), the housing surrounding wall 14 can just be open at the bottom 15, to provide the outlet 22 (see FIG. 9).

In some assemblies 10, the housing arrangement 12 can have a closed bottom (not shown).

Figure 9:
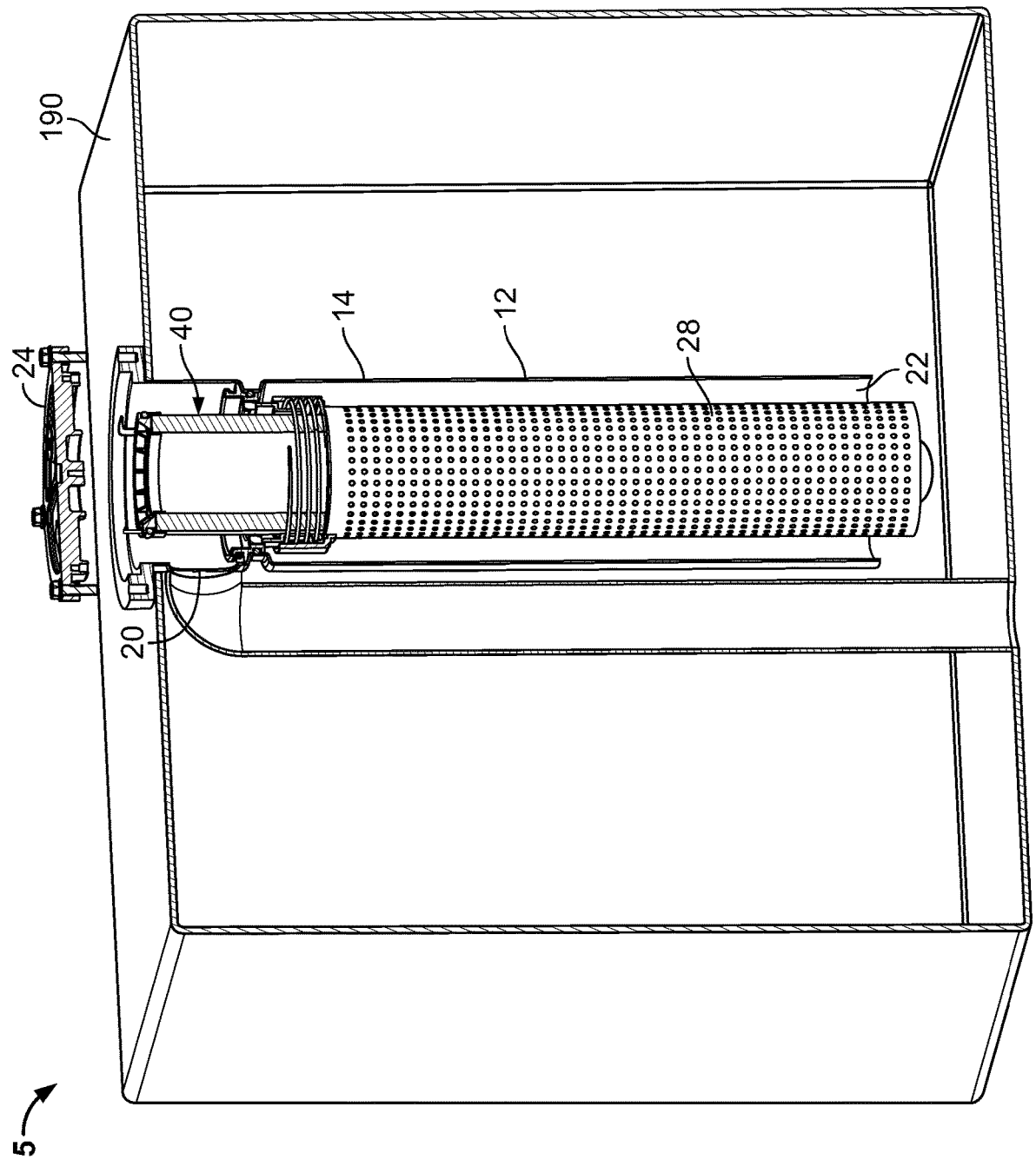
FIG. 9 is a schematic perspective exploded view of the liquid filter assembly of FIG. 1 in a tank, a portion of the tank being removed so that the interior is visible.
Figure 10:
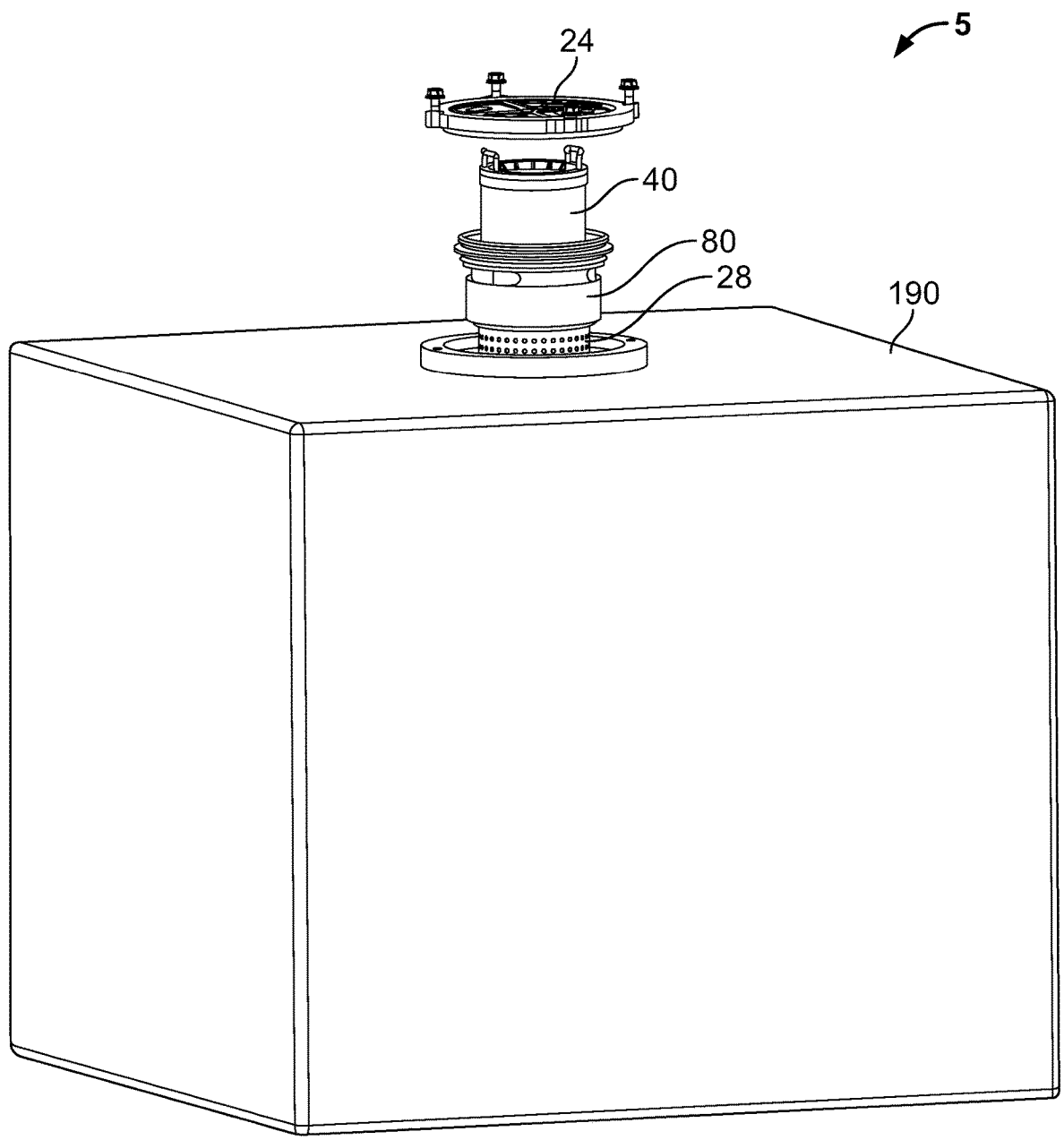
FIG. 10 is a schematic perspective exploded view of the liquid filter assembly of FIG. 9, from a view outside of the tank.
Figure 11:
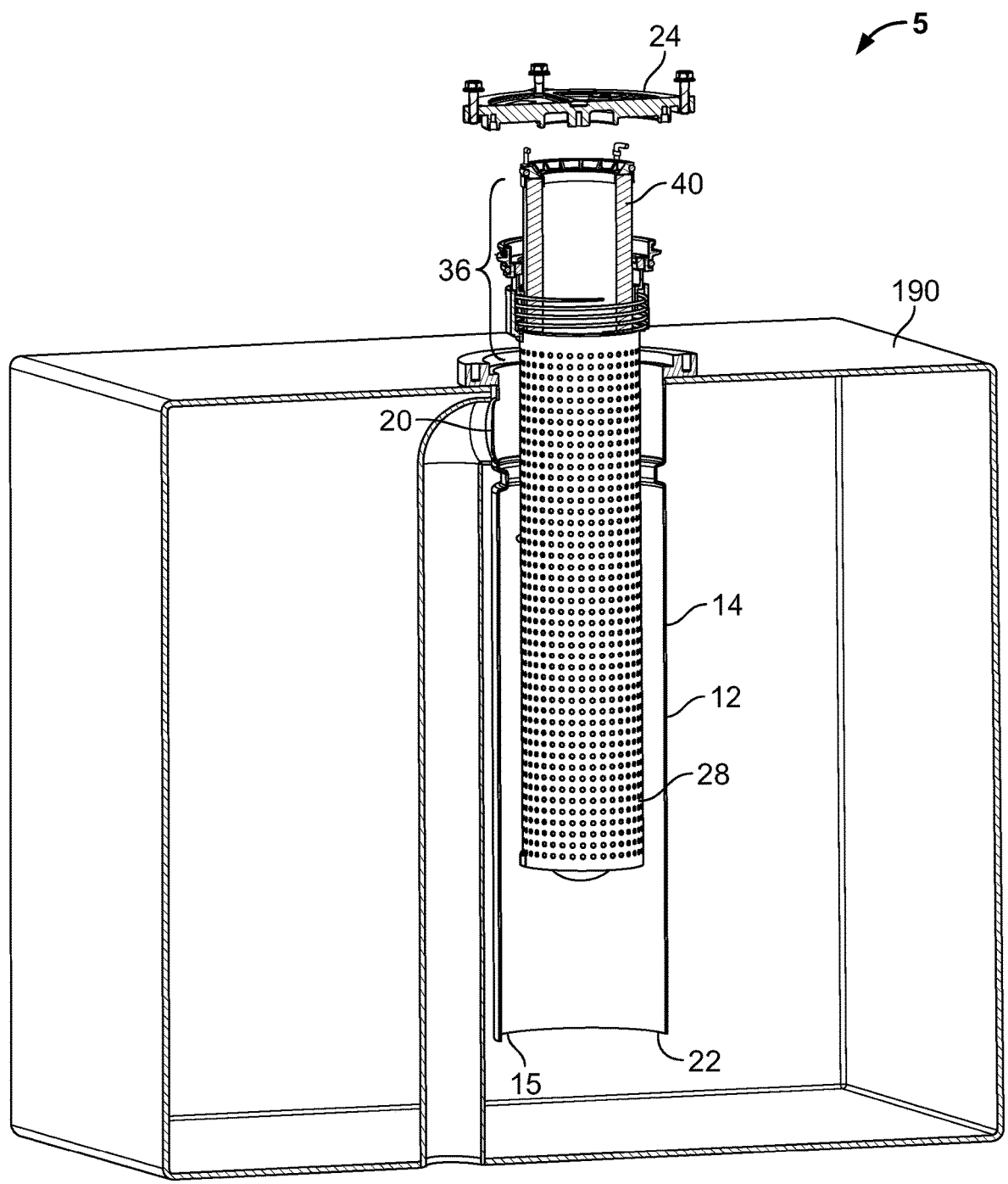
FIG. 11 is another schematic perspective exploded view of the liquid filter assembly of FIGS. 9 and 10, a portion of the tank being removed so that the interior is visible.

One general type of filtration system shown in FIGS. 9-11 is sometimes referenced as in-tank system 5. In-tank filter systems are described, for example, in PCT publication WO 2005/063358, published Jul. 14, 2005; and, in PCT publication WO 2008/030323, published Mar. 13, 2008. Each of these two PCT publications is incorporated herein by reference.

In general terms, the in-tank filter system 5, is a system configured to be mounted on a reservoir tank 190 for the liquid involved. The system 5 will typically provide for at least one of: liquid flow to the tank; or draw liquid from the tank. Typically, in-tank filter assembly 5 includes housing arrangement 12 having a removable, i.e. serviceable, filter element 40 appropriately positioned therein. The filter element 40 is periodically removed for servicing, for example when it becomes sufficiently occluded to generate an undesirable level of restriction across the filter media, or when a service interval is passed. Servicing typically involves one of: replacing with a new filter element 40; replacing with a previously used, but refurbished, filter element 40; or, in some manner cleaning the removed element 40 and replacing it for further use.

The filter assemblies 10 described herein are preferably part of in-tank filter systems 5. In some implementations, they may be part of alternate arrangements.

The housing arrangement 12 can also include a removable cover 24. The cover 24 can be secured to the housing 14 by way of suitable fasteners 26. In this way, the cover 24 can be selectively removed from the housing 14. Removing the cover 24 from the housing 14 will allow access to the housing interior 18.

When the housing arrangement 12 is part of the in-tank filter system 5, the cover 24 can be on the exterior of the tank 190.

Independent of the above, the liquid filter assembly 10 includes a support member 28. The support member 28 is operably oriented in the housing interior 18.

The support member 28 can be rigid. By rigid, it is meant that the support member 28 is not generally flexible and will not change shape in response to normal amounts of compressive force occurring during handling. Alternatively, the support member 28 can be a thin (2 mm or less in thickness) screen that, while being generally compressible, resists expansion forces.

The support member 28 can be porous. The porous nature of the support member 28 allows liquid to flow through it.

The support member 28 can be tubular in shape. It can have a surrounding wall 30 defining an interior volume 32 within the support member wall 30.

The support member 28 can have a closed bottom end 34. In other embodiments, the support member 28 could have an open bottom end.

The support member 28 can be cylindrical in shape, in some embodiments.

Independent of the above, the liquid filter assembly 10 can include filter element 40. The filter element 40 can be arranged relative to the housing arrangement 12 to receive unfiltered liquid from the housing inlet 20, to filter the liquid, and then allow the filtered liquid to exit the housing arrangement 12 through the outlet 22.

The filter element 40 can be removably and replaceably oriented in the housing interior 18.

Figure 2:
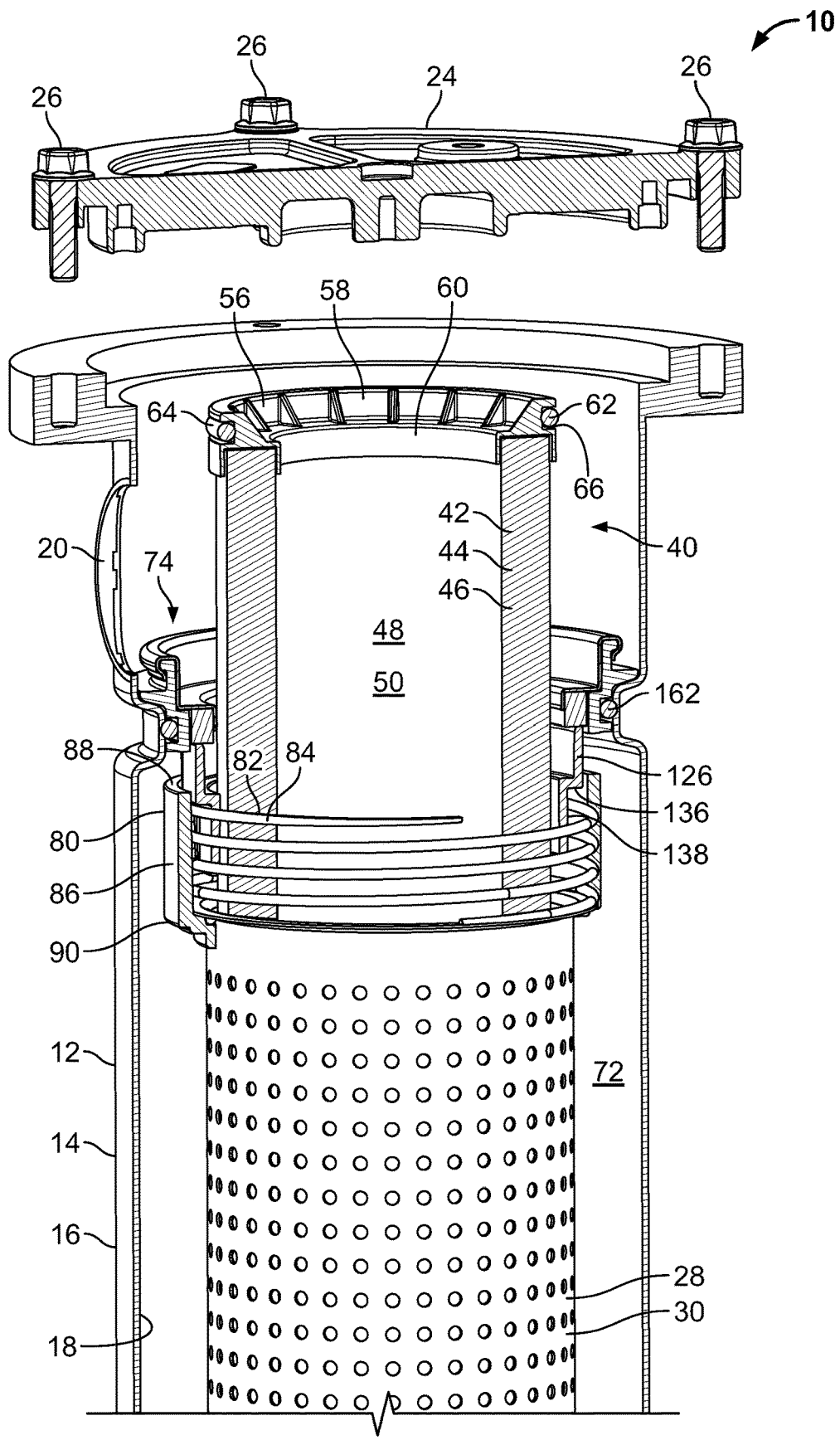
FIG. 2 is an exploded perspective view of a portion of the filter assembly of FIG. 1.
Figure 6:
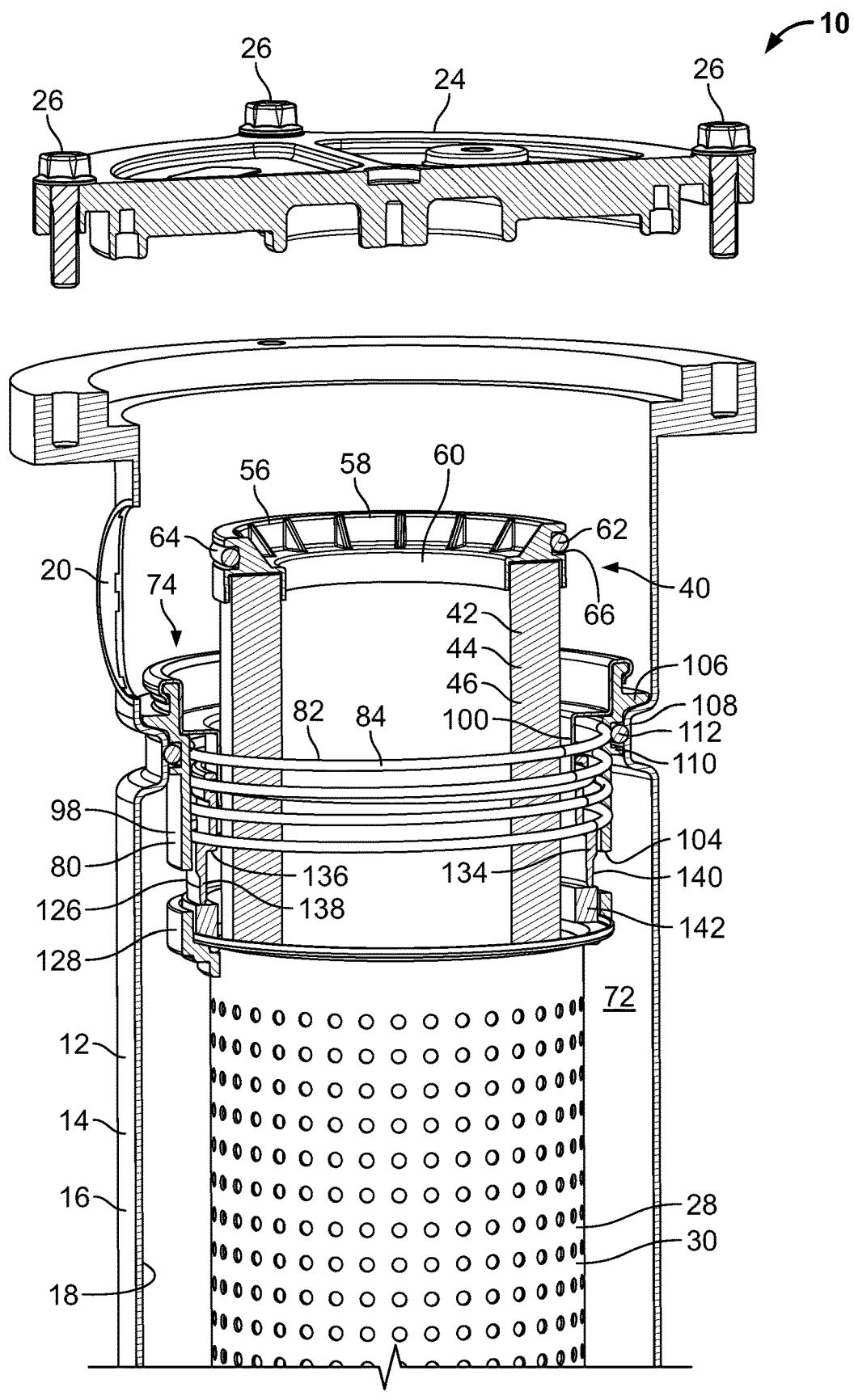
FIG. 6 is an exploded, perspective view of a portion of the filter assembly of FIG. 5.

Independent of the above, the filter element 40 can be removably and replaceably oriented in the interior volume 32 of the support member 28. In FIGS. 2 and 6, the filter element 40 can be seen as it is being assembled within the interior volume 32 of the support member 28.

Figure 12:
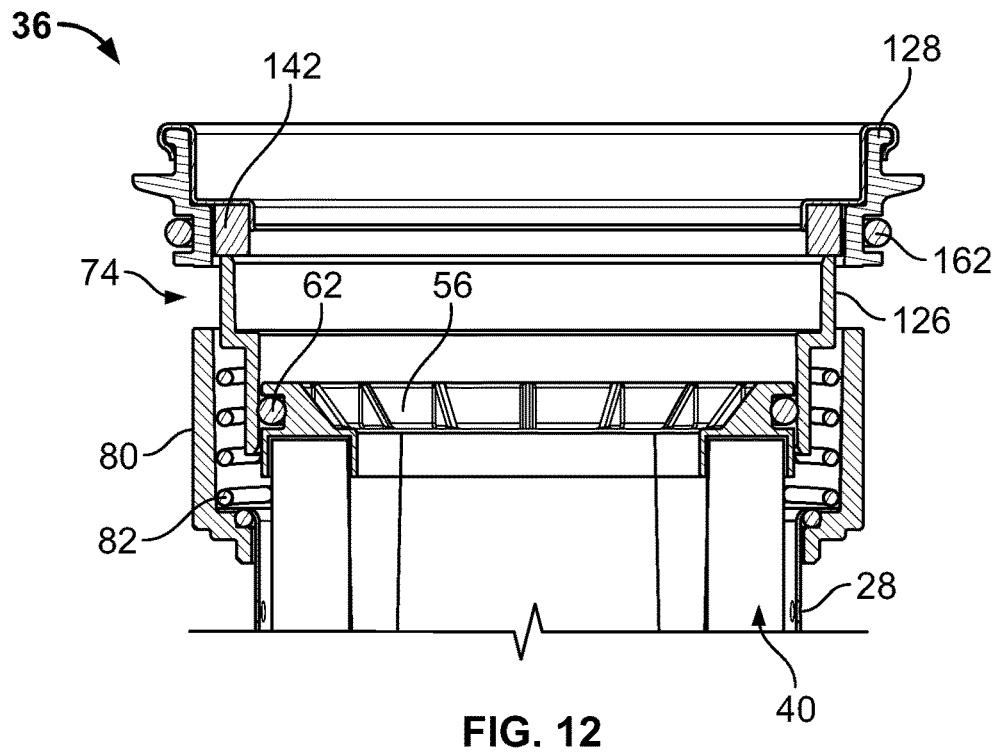
FIG. 12 is a cross-sectional view of a portion of a module assembly, including a support tube and filter element, used in the assembly of FIGS. 1-4.
Figure 13:
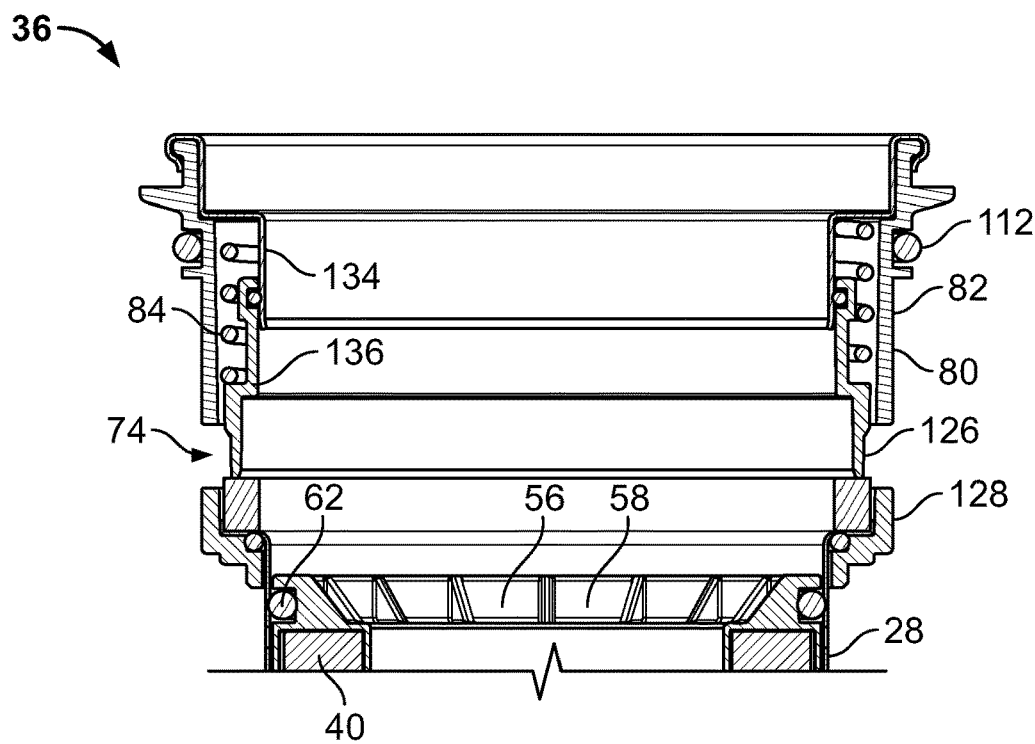
FIG. 13 is a cross-sectional view of a portion of a module assembly, including a support tube and filter element, used in the assembly of FIGS. 5-8.

Together, the support member 28 and filter element 40 may form a module assembly 36 (FIGS. 11-13).

The module assembly 36 can be used inside of tank 190, in which the separation room is built in the inside of the tank 190. Alternatively, the module assembly 36 can be used to complete a filter assembly to be top tank mounted.

Independent of the above, the filter element 40 can include a media pack 42. The media pack 42 will include filter media 44. When liquid passes through the filter media 44, the filter media 44 will remove debris and particulate from the liquid.

The media pack 42 can be a tubular media pack 46. The tubular media pack 46 defines a media interior 48 within the tubular media pack 46. In some embodiments, the media interior 48 can be an upstream side, containing an unfiltered liquid volume 50.

Independent of the above, the media pack 42 can be secured to a first end cap 52. The first end cap 52 can be an open end cap or a closed end cap. In the examples shown in the FIGS., the first end cap 52 is a closed end cap 54. The first end cap 52 can be adjacent to the bottom end 34 of the support member 28. In the embodiment shown, the first end cap 52 can be adjacent and against the closed bottom end 34.

Independent of the above, the media pack 42 can be secured to a second end cap 56. The second end cap 56 can be at an end of the element 40 opposite from the first end cap 52.

The second end cap 56 can be an open end cap 58.

The open end cap 58 defines an opening 60, which allows for access to the media interior 48.

Independent of the above, the filter element 40 includes a seal member 62. The seal member 62 can be useful in forming a seal with another component in the liquid filter assembly to prevent unfiltered liquid from bypassing the media pack 42.

In example embodiments, the filter element seal member 62 can be in the form of an O-ring seal member 64. Alternate seals such as lip seals, bulb seals, or flat gaskets may also be used.

The seal member 62 can be held by the open end cap 58. When the seal member 62 is O-ring seal member 64, the open end cap 58 can include a radial groove 66.

In some examples, the radial groove 66 can be outwardly directed. The O-ring seal member 64 can be held by the radial groove 66 to form a seal with another component within the liquid filter assembly 10. The seal can be a radial seal. In some configurations, the seal is partially or wholly positioned to form an axial seal Independent of the above, the media pack 42 can comprise pleated media. For example, the media pack 42 can comprise a pleated cellulose media. In some configurations, the media is non-pleated.

Independent of the above, the media pack 42 can extend an entire length between the closed end cap 54 and open end cap 52.

In the embodiment of FIGS. 5-8, the filter element seal member 62 forms a seal 68 against the support member 28.

In example embodiments, the seal 68 is formed by the seal member 62 between and against the radial groove 66 and an inside surface 70 (FIG. 7) of the support member wall 30.

Independent of the above, in some example assemblies 10, the filter element 40 is arranged for inside to outside flow. That is, in some arrangements, the filter element 40 is arranged relative to the housing arrangement 12 to receive unfiltered liquid from the housing inlet 20, into the media interior 48, where it is part of the unfiltered liquid volume 50. From the unfiltered liquid volume 50, the liquid flows through the media pack 42 and then through the support member 28, where it becomes part of a filtered liquid volume 72. The filtered liquid volume 72 is the volume within the housing interior 18 and outside of the interior volume 32 of the support member 28. From the filtered liquid volume 72, the liquid then flows through the housing outlet 22.

To account for instances when restriction across the media pack 42 reaches a predetermined level, the filter assembly 10 has a bypass valve arrangement 74. The bypass valve arrangement 74 will permit at least some unfiltered liquid to bypass the media pack 42 and flow into the filtered liquid volume 72 outside of the support member 28.

The module assembly 36 can include, as part of it, the bypass valve arrangement. Thus, in some example implementations, the module assembly 36 can include the support member 36, filter element 40, and bypass valve arrangement 74.

Independent of the above, the bypass valve arrangement 74 can include a bias member seat 80.

The biasing member 82 will be operably held by the bypass member seat 80.

In example embodiments, the biasing member 82 can be in the form of a spring 84.

In the embodiment of FIGS. 1-4, the bias member seat 80 can be attached to the support member 28.

In reference to the examples shown in FIGS. 1-4, the bias member seat 80 can be embodied as a tube 86. The tube 86 can surround and be radially spaced from at least a portion of the filter element 40. The tube 86 is typically circular or oval in cross-section, but other shapes are possible.

Figure 3:
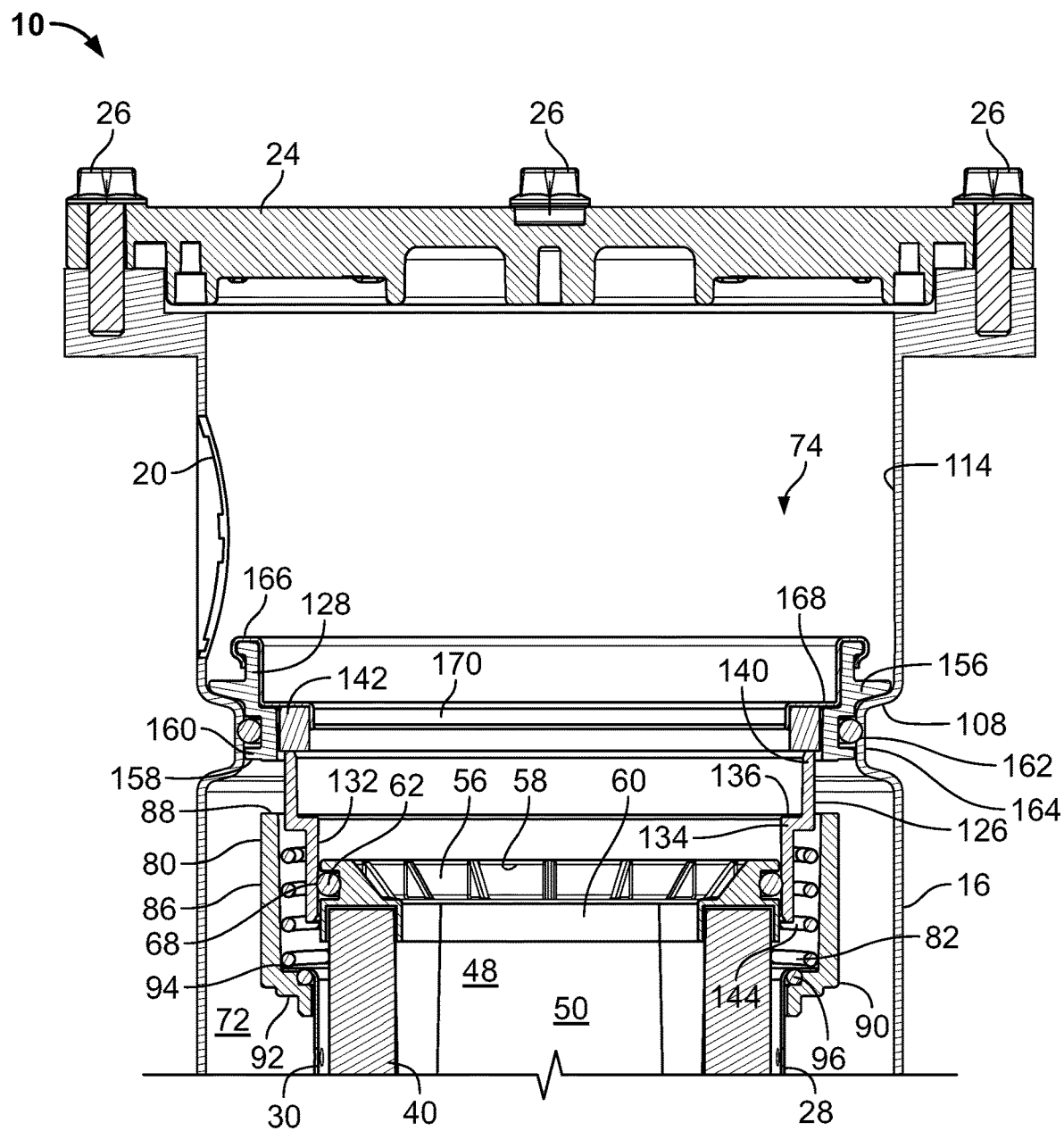
FIG. 3 is an enlarged cross-sectional view of a portion of the filter assembly of FIG. 1, and depicting the bypass valve in a closed position.

In FIG. 3, in this example embodiment, the tube 86 includes an open end 88 and an opposite attachment end 90.

The attachment end 90 can include a radially inwardly extending rim 92. The support member 28 has an outwardly extending rim 94, which may be generally perpendicular to the support member wall 30. The support member rim 94 overlaps an inside surface of the tube rim 92.

Independent of the above, between the support member 28 and the tube 86, there can be a seal member 96. In the example shown in FIG. 3, the seal member 96 is between the support member rim 94 and the tube rim 92. This seal member 96 forms a seal between the tube 86 and the support member 28. In some embodiments, the tube 86 is an integral part of the support member 28 or is permanently secured thereto, by welding or adhesive, for example, and no seal member 96 is necessary.

In the embodiment of FIGS. 5-8, the bias member seat 80 is attached to the housing arrangement 12.

Independent of the above, in the embodiment of FIGS. 5-8, the bias member seat 80 includes an outer tube 98. The outer tube 98 surrounds and is radially spaced from at least a portion of a valve head 126, to be discussed further below.

Figure 7:
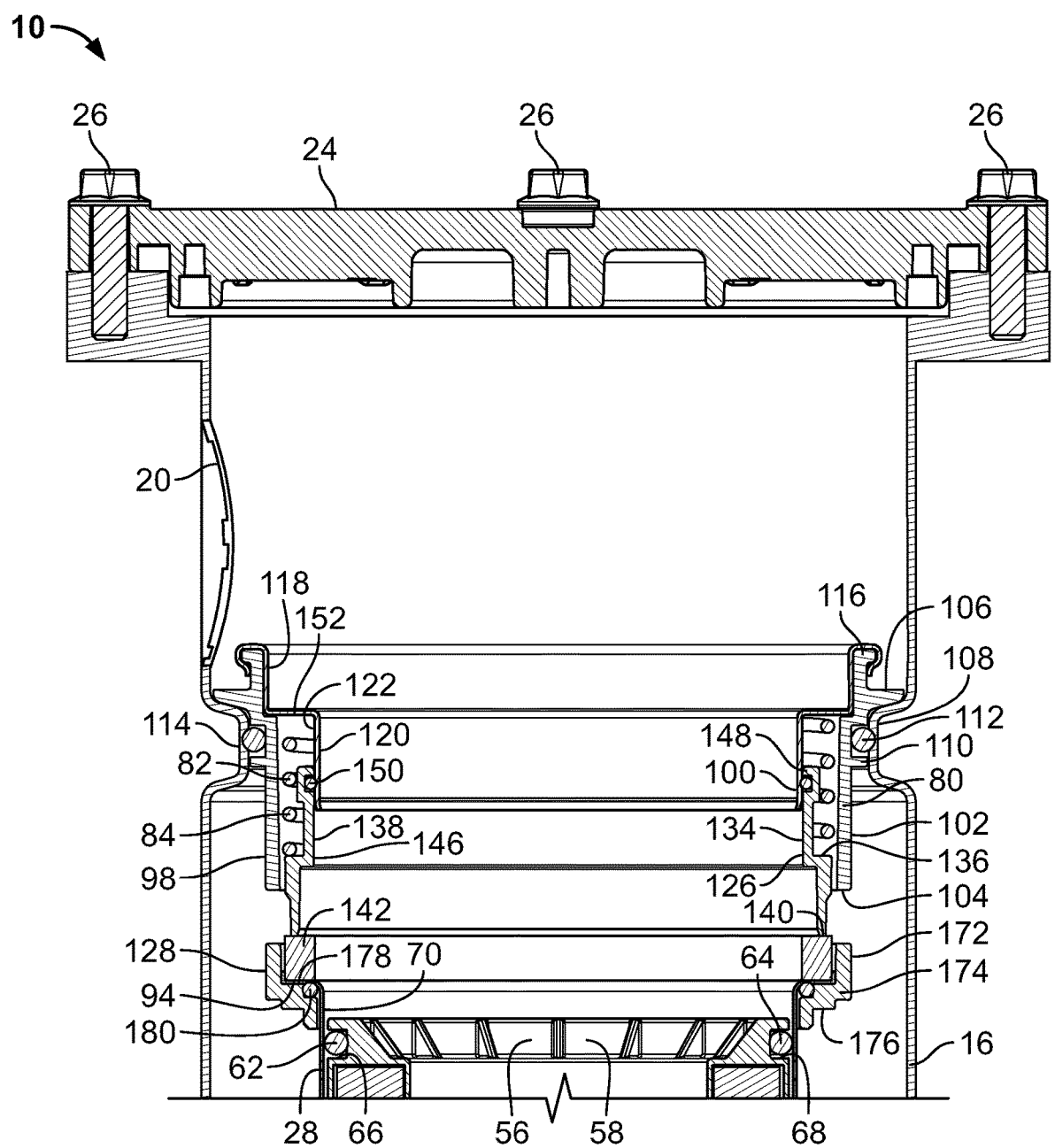
FIG. 7 is an enlarged, cross-sectional view of a portion of the filter assembly of FIG. 5, and showing the bypass valve in a closed position.

Still in reference to FIG. 7, the bias member seat 80 includes an inner tube 100. The inner tube 100 is radially spaced from at least a portion of the outer tube 98 to hold the biasing member 82 in between.

Independent of the above, in the example embodiment shown in FIG. 7, the outer tube 98 includes a straight wall section 102 having a free end 104. At a portion of the outer tube 98 opposite of the free end 104, there is a radially outward projection 106. The radially outward projection 106 engages an inwardly extending shelf 108 of the housing surrounding wall 16.

Still in reference to FIG. 7, along the straight wall section 102 and adjacent to the projection 106 is a seal member seat 110. The seal member seat 110 holds a seal member 112. The seal member 112 forms a seal with an inside surface 114 of the housing surrounding wall 16.

Independent of the above, and still in reference to FIG. 7, adjacent to the radial projection 106 is an axial projection 116. Axial projection 116, in the example embodiment shown, forms an end that is opposite from the free end 104.

Still in reference to FIG. 7, and independent of the above, the inner tube 100 can include a tube fastening section 118. The tube fastening section 118 is fastened or secured to the outer tube 98.

In the illustrated example of FIG. 7, the tube fastening section 118 is secured to the axial projection 116 of the outer tube 98.

Independent of the above, the inner tube 100 includes an inner tube section 120 that is radially inward of the tube fastening section 118. The inner tube section 120 is radially spaced from the straight wall section 102 of the outer tube 98.

Figure 8:
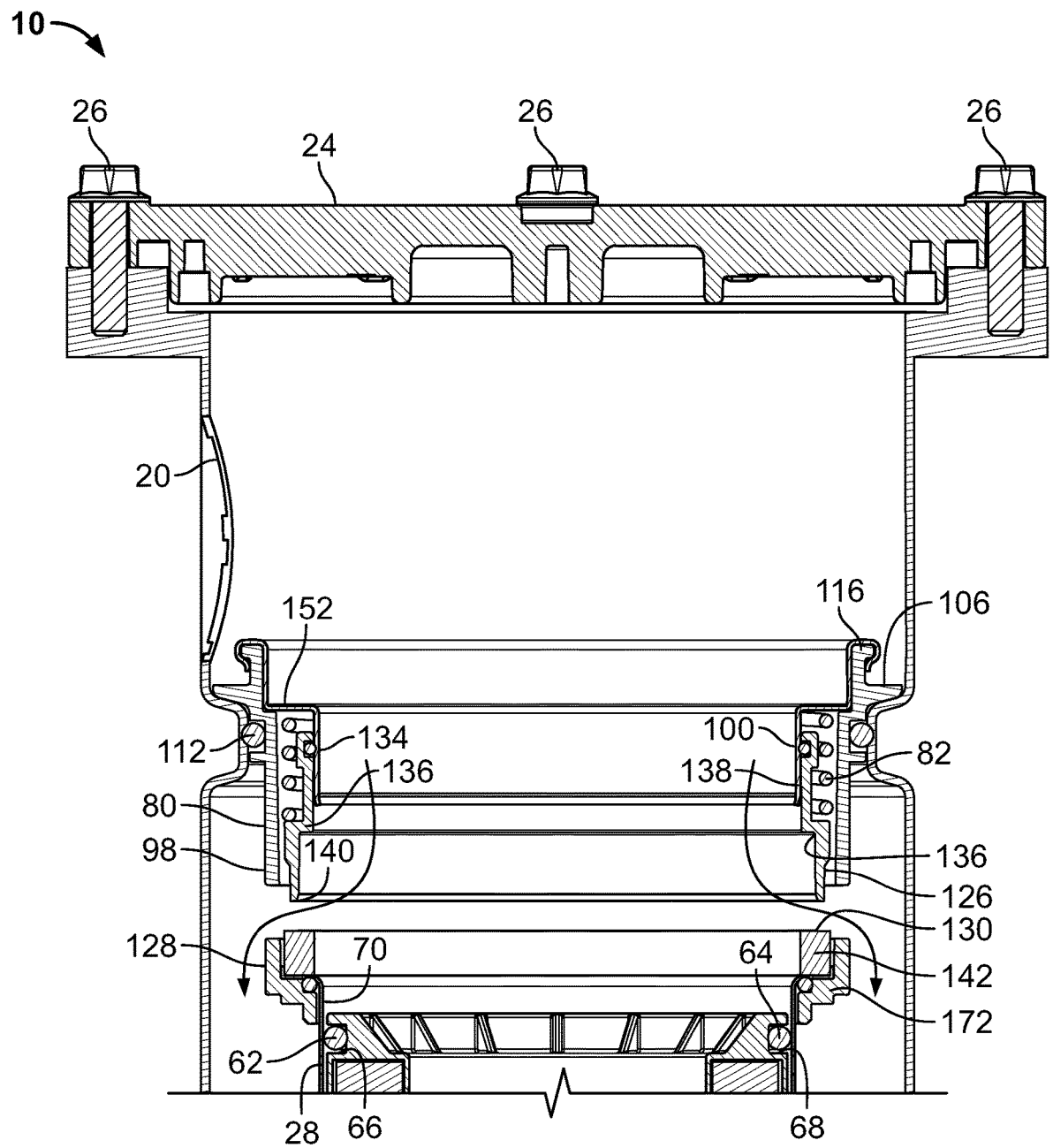
FIG. 8 is a view similar to FIG. 7 and showing the bypass valve in an open position.

Still in reference to FIGS. 7 and 8, and independent of the above, the inner tube section 120 has a sealing surface 122 along an outside of the section 120. The sealing surface 122 provides a surface for forming a seal, as discussed further below. In some embodiments, the sealing surface 122 is on the inside of section 120.

Independent of the above, the bypass valve arrangement 74 includes a valve head 126.

The valve head 126 can be positioned within the bias member seat 80.

Independent of the above, the valve head 126 can be engaged against the biasing member 82.

Independent of the above, the bypass valve arrangement 74 can include a valve seat 128. The valve seat 128 is in removable sealing engagement with the valve head 126.

In example embodiments, when the valve head 126 is moved out of sealing engagement with the valve seat 128, a bypass opening 130 (FIGS. 4 and 8) allows flow of unfiltered liquid into the filtered liquid volume 72. When the valve head 126 is in sealing engagement with the valve seat 128, the bypass opening 130 is closed, preventing unfiltered liquid from bypassing the media pack 42. In reference now to the embodiment of FIGS. 1-4, and specifically to FIG. 3, the valve head 126 can include a sealing surface 132. The filter element seal member 62 is sealed against the sealing surface 132.

Figure 4:
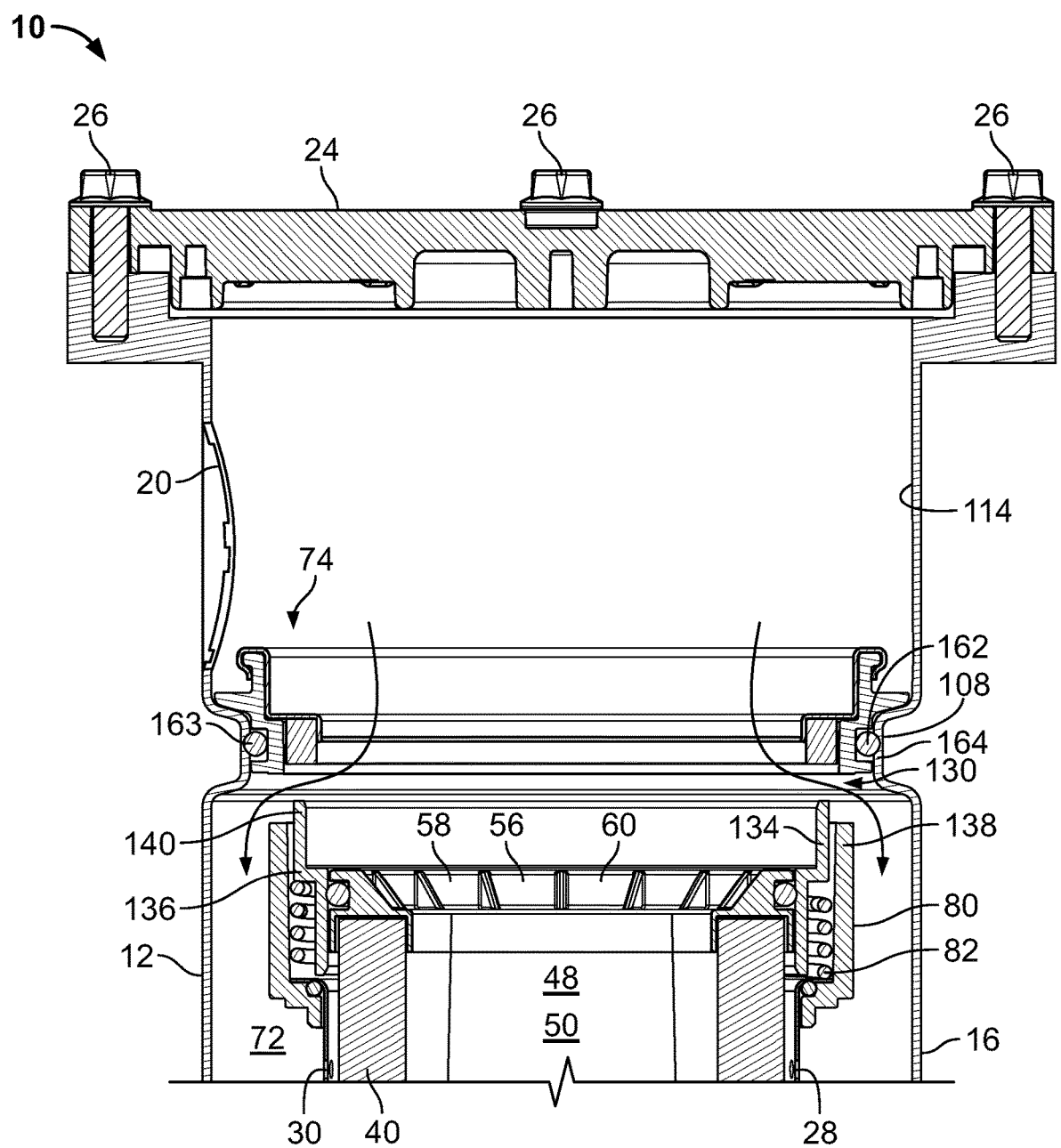
FIG. 4 is a view similar to FIG. 3, but showing the bypass valve in an open position.

Independent of the above, in FIGS. 4 and 8, the valve head 126 may be embodied as a ring 134 having a step 136 to form a stepped ring 138. In some example embodiments, when the valve head 126 includes stepped ring 138, the stepped ring 138 can have an axial end 140 (FIGS. 3, 4, 7, 8). The axial end 140 can be in sealing engagement with the valve head 126.

Independent of the above, and in reference to FIGS. 3, 4, 7, 8, there can be a bypass valve seal member 142 operably held by the valve seat 128. The axial end 140 of the valve head 126 can be in sealing engagement against the bypass seal member 142 when the bypass opening 130 is closed. The axial end 140 can be spaced away from the bypass seal member 142 when the bypass opening 130 is opened.

Independent of the above, the biasing member 82 can be engaged against the step 136 in the ring 134. The biasing member 82 will provide a force against the step 136 to resist fluid pressure within the unfiltered liquid volume 50. When the pressure within the unfiltered liquid volume 50 becomes sufficiently large to create a force on the step 136 to overcome the force of the biasing member 82, the fluid pressure will push against the step 136 and move the valve head 126 against the biasing member 82. This will move the axial end 140 of the ring 134 away from sealing engagement with the bypass valve seal member 142. This will open the bypass opening 130 (see FIGS. 4 and 8).

In the embodiment of FIGS. 1-4, and specifically referring to FIGS. 3 and 4, as the valve head 126 is moved away from the valve seat 128, the filter element seal member 62 moves along and slides against the sealing surface 132 of the valve head 126.

The seal member 62 forms seal 68 with the sealing surface 132 of the valve head 126.

Independent of the above, a dynamic seal is engaged as the valve head 126 moves into and out of sealing engagement. In one or more example embodiments, the seal member 62 is configured to form seal 68 to be a dynamic seal. The dynamic seal 68 is configured to repeatedly change position, as it slides along and against sealing surface 132.

The seal member 62, in examples embodied as O-ring 64, can be configured to form seal 68 to be dynamic seal, which is configured to repeatedly change position, as it slides along and against sealing surface 132.

Independent of the above, and still in reference to the embodiment of FIGS. 1-4, it can be seen how the tube 86 of the bias member seat 80 is radially spaced from a portion of the valve head 126 (FIG. 3). The bias member 82 is located between the inner surface of the tube 86 and an outer surface of the ring 134, with the biasing member 82 engaged against the step 136 of the ring 134.

Still in reference to FIGS. 1-4, and independent of the above, the ring 134 has a second axial end 144 (FIG. 3), opposite of the axial end 140. The support member rim 94, where it is engaged with the tube rim 92, will form a stop surface for the second axial end 144 to engage, to prevent the valve head 126 from moving beyond that point.

Independent of the above, and in reference now to the embodiment of FIGS. 5-8, in particular FIGS. 7 and 8, the stepped ring 138 has an inside surface 146. The inside surface 146 is in sealing engagement with the inner tube 100 of the bias member seat 80.

In the examples shown in FIGS. 7 and 8, the inside surface 146 of the stepped ring 138 is in sealing engagement with the sealing surface 122 of the inner tube section 120.

Independent of the above, and still in reference to FIGS. 7 and 8, the stepped ring 138 can include a seal ring groove 148 at or adjacent to a portion that is on an opposite end as the axial end 140 of the ring 134. The seal ring groove 148 can hold a seal member, such as an O-ring seal member 150. The seal member 150 can form a seal with the sealing surface 122 of the inner tube 100 of the bias member seat 80.

Still in reference to FIGS. 7 and 8, and independent of the above, the biasing member 82 is held in the bias member seat 80 between the straight wall section 102 of the outer tube 98 and the valve head 126.

In the examples shown in FIG. 7, the biasing member 82 is between the straight wall section 102 of the outer tube 98 and the ring 134. The biasing member 82 is engaged against the step 136 and is held between the step 136 and a shoulder 152 that can be part of the inner tube 100. The shoulder 152 can extend between the tube fastening section 118 and the inner tube section 120.

Independent of the above, and in reference to the embodiment of FIGS. 7 and 8, the biasing member 82 will cause a force on the step 136 and against a force on an opposite side of the step 136 from fluid pressure in the unfiltered liquid volume 50. When the pressure in the unfiltered liquid volume 50 increases due to, for example, increased restriction across the media pack 42, the force against the step 136 will overcome the force of the biasing member 82. This will move the valve head 126 so that the seal member 150 slides along and against the inner tube 100 of the bias member seat 80. As the valve head 126 moves in an axial direction, the axial end 140 of the ring 134 is moved away from the bypass valve seal member 142, which opens the bypass opening 130 (FIG. 8).

Independent of the above, a dynamic seal is engaged as the valve head 126 moves into and out of sealing engagement. In one or more example embodiments, the seal member 150 is configured to form the dynamic seal, configured to repeatedly change position, as it slides along and against the inner tube 100 of the bias member seat 80.

The seal member 150, in examples embodied as an O-ring seal member, can be configured to form the dynamic seal, which is configured to repeatedly change position, as it slides along and against the inner tube 100 of the bias member seat 80. For example, the sealing engagement between the inside surface of the stepped ring 134 and the inner tube 100 of the bias member seat 80 is a dynamic sealing engagement.

Independent of the above, and in reference now to the embodiment of FIGS. 1-4, the valve seat 128 can be secured to the housing arrangement 12.

In a non-limiting example in FIG. 3, the valve seat 128 can include a radial projection 156. The radial projection 156 engages against the inwardly extending shelf 108 of the housing surrounding wall 16. This engagement can help to hold the valve seat 126 in place relative to the housing arrangement 12. Other embodiments are possible.

Independent of the above, and still in reference to FIG. 3, the valve seat 128 can include a seal member holding section 158. The seal member holding section 158 can include a groove 160 for holding a seal member 162. The seal member 162 forms a seal 163 (FIG. 4) against the inside surface 114 of the housing surrounding wall 16.

Independent of the above, in the examples shown in FIG. 4, the seal 163 between the seal member 162 and the housing surrounding wall 16 is formed along the radially inwardly extending section of 164 of the shelf 108.

Independent of the above, and still in reference to FIG. 3, adjacent to the radial projection 156 can be an axial projection 166 in the valve seat 128. The axial projection 166 can also form one end of the valve seat 128 opposite from an end forming the seal member holding section 158.

Independent of the above, and still in reference to FIG. 3, the valve seat 128 can include a seal member seat 168. The seal member seat 168 can hold the bypass valve seal member 142. In the examples shown in FIGS. 3 and 4, the seal member seat 168 is adjacent to the seal member holding section 158.

In the examples shown in FIG. 3, the seal member seat 168 is on an opposite side of the seal member holding section 158 from the seal member 162.

Independent of the above, and in the non-limiting examples shown in FIG. 3, the valve seat 128 can include an inner ring 170. The inner ring 170 is spaced radially from the seal member holding section 158, to define the seal member seat 168 therebetween.

In the example shown in FIG. 3, the bypass valve seal member 142 is held in the seal member seat 168 between the inner ring 170 and the seal member holding section 158.

Independent of the above, and in reference to the embodiment of FIG. 3, the inner ring 170 can be secured to the remaining portion of the valve seat 128 by securing the ring 170 to the axial projection 166. There can be many variations.

In reference now to the embodiment of FIGS. 7 and 8, and independent of the above, the valve seat 128 in this embodiment can be secured to the support member 28.

Independent of the above, in the embodiment of FIGS. 7 and 8, the valve seat 128 can include a band 172.

In the non-limiting examples shown in FIGS. 7 and 8, the band 172 surrounds at least a portion of the support member 28.

Independent of the above, and still in reference to FIG. 7, the band 172 can include an axially extending wall 174. Extending inwardly from the wall 174 is an inwardly projecting rim 176.

Independent of the above, and in the example embodiments shown in FIG. 7, the wall 174 and rim 176 form a shoulder 178. The shoulder 178 can be used to hold the bypass valve seal member 142.

Independent of the above, and in reference to FIG. 7, the support member rim 94 can overlap the rim 176. A seal member 180 can be between the support member rim 94 and the rim 176 to form a seal therebetween.

Figure 14:
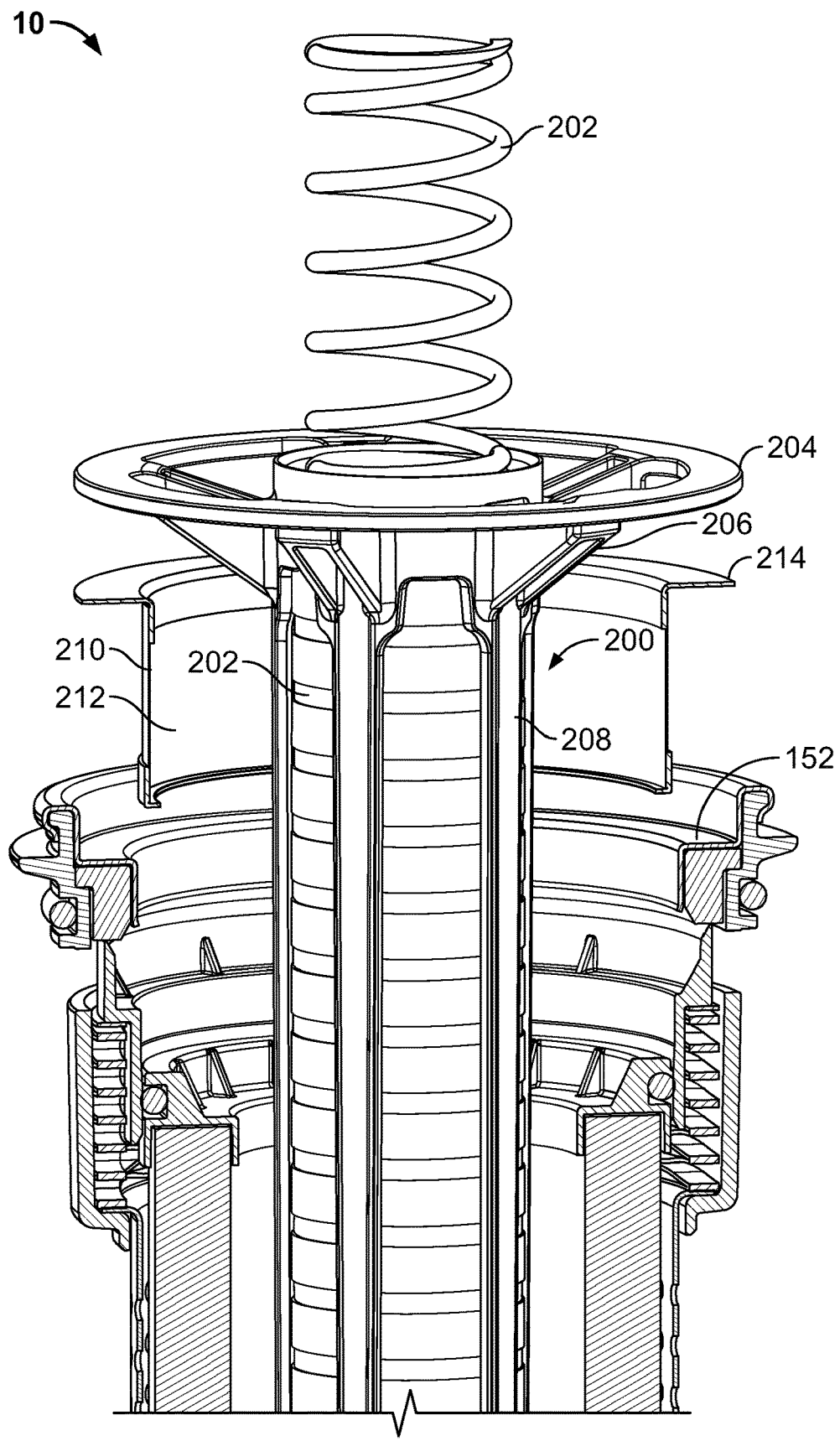
FIG. 14 is a schematic exploded perspective view of a portion of the filter assembly of FIGS. 1-4 and including additional optional components.

Independent of the above, the liquid filter assembly 10 can include an optional magnet holder 200 (FIG. 14). The magnet holder 200 is shown used with the assembly of FIGS. 1-4, and it should be understood that it is also optionally usable with the assembly of FIG. 5-8.

The magnet holder 200 may be constructed to be oriented in the unfiltered liquid volume 50 (FIG. 1), such that liquid entering the assembly 10 from the inlet 20 flows through the magnet holder 200. The magnet holder 200 can hold a magnet arrangement 202, which will attract metal particles from the incoming liquid.

The magnet holder 200 can include an outer ring 204, which can rest on the shoulder 152. Gussets 206 can join the outer ring 204 to a main body 208 of the magnet holder 200. The main body 208 can be used to hold the magnet arrangement 202.

Independent of the above, the liquid filter assembly 10 can include an optional bypass screen 210. The bypass screen 210 is shown used with the assembly of FIGS. 1-4, and it should be understood that it is also optionally usable with the assembly of FIG. 5-8. The screen 210 is shown used with the magnet holder 200, but it should be understood that it can be used without the magnet holder 200.

The bypass screen 210 will act as a coarse filter 212 to remove at least some debris larger than the screen size, in situations when the bypass opening 130 is opened (FIGS. 4 and 8). Any bypass flow will flow through the bypass screen 210 before reaching the filtered liquid volume 72 (FIG. 1).

In the example shown in FIG. 14, the bypass screen 210 includes a radial extending ring 214. The ring 214 is positionable on the shoulder 152.

In some embodiments which use both the magnet holder 200 and the bypass screen 210, the ring 214 can be between and against the shoulder 152 and the outer ring 204 of the magnet holder 200.

Figure 15:
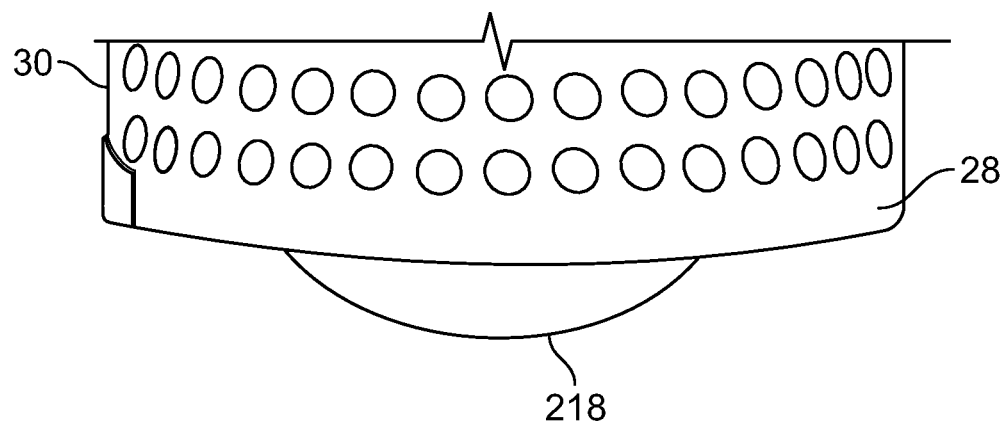
FIG. 15 is a perspective view of a portion of a bottom end of a support tube useable with embodiments herein.
Figure 16:
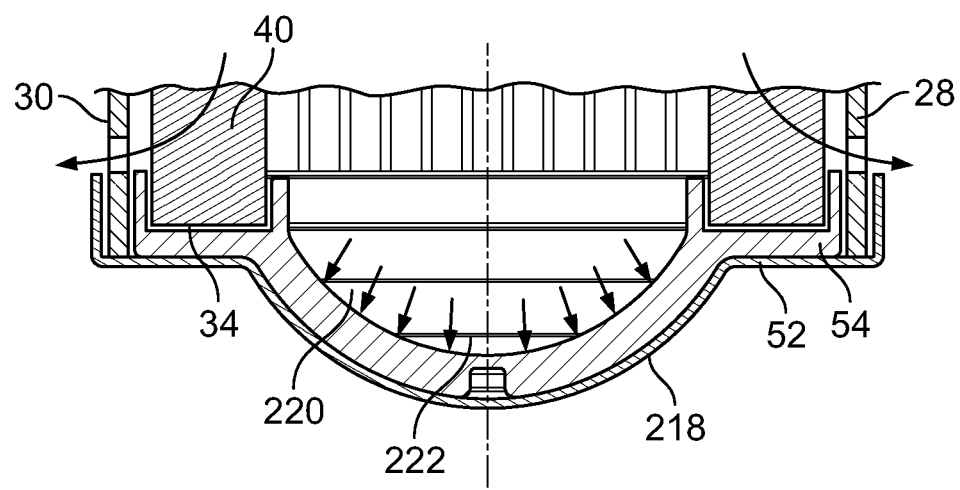
FIG. 16 is a schematic, cross-sectional view of the bottom end of the support tube of FIG. 15 and depicting the end of the filter element assembled therein.
Figure 17:
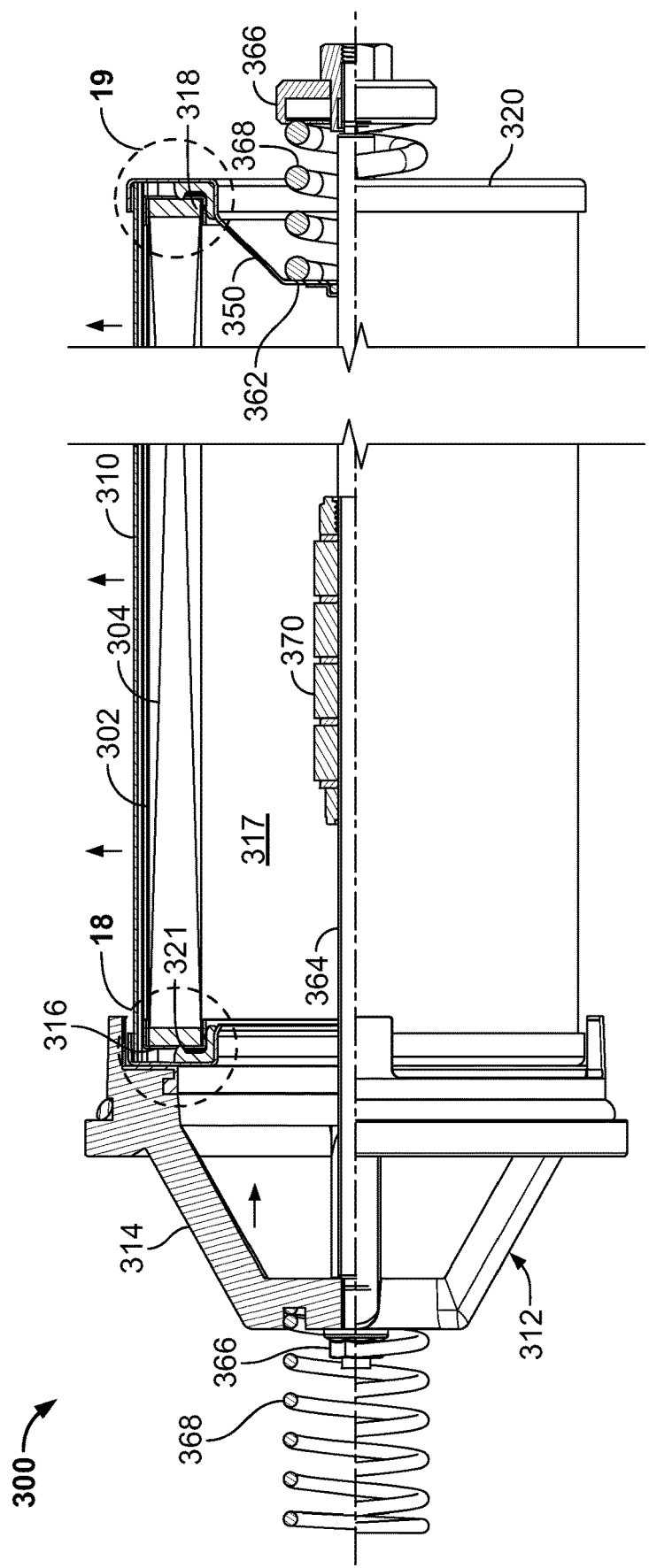
FIG. 17 is a partial cross-sectional view of another embodiment of a filter assembly, the cross-section being taken along the line 17-17 of FIG. 20.
Figure 18:
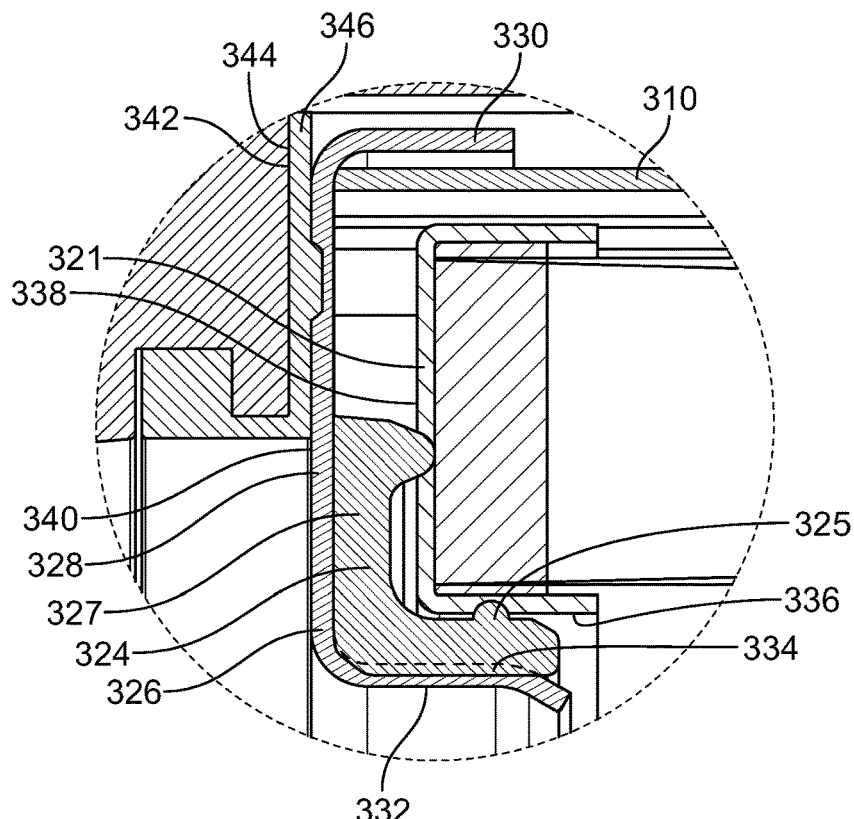
FIG. 18 is an enlarged view of section A-A of FIG. 17.
Figure 19:
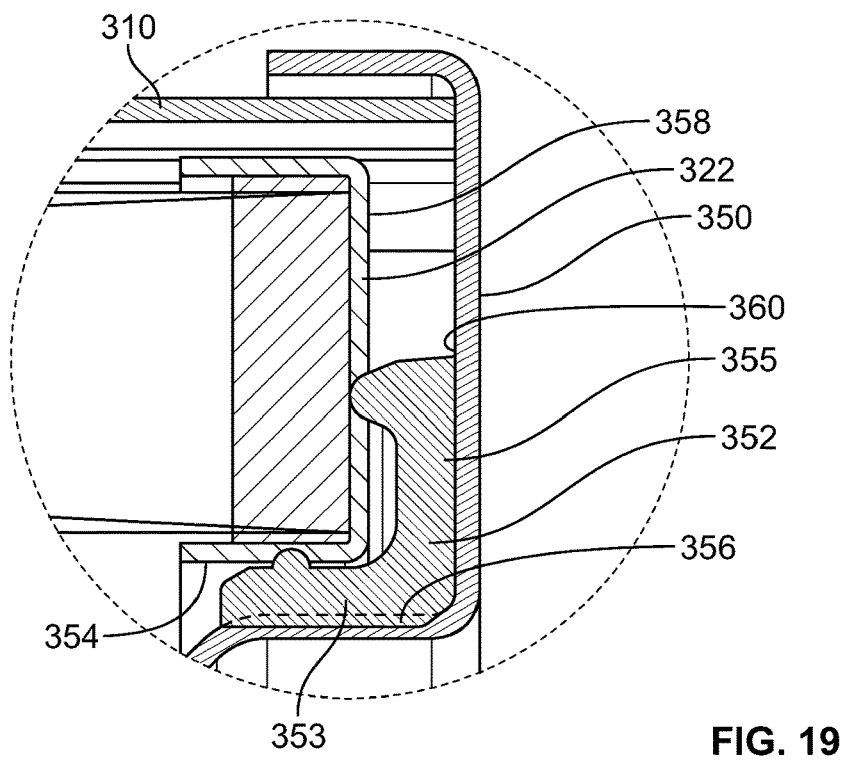
FIG. 19 is an enlarged view of section B-B of FIG. 17.
Figure 20:
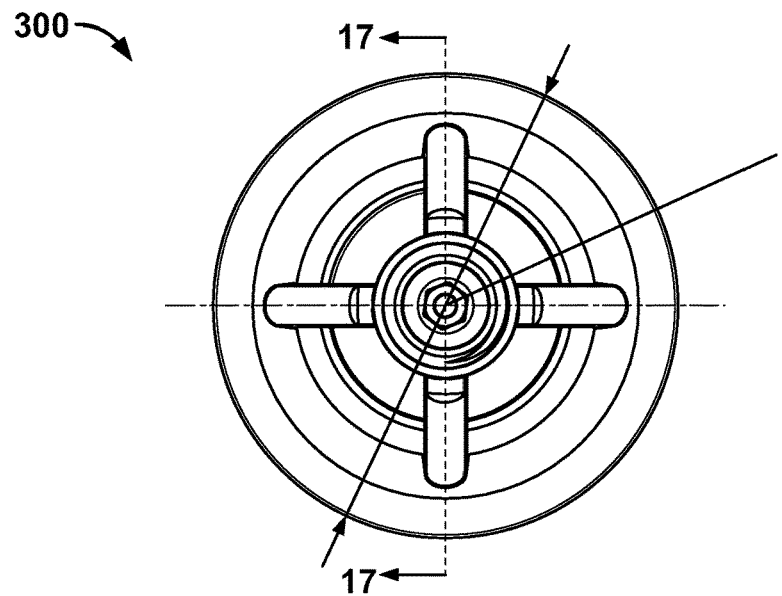
FIG. 20 is an end view of FIG. 17.

Independent of the above, and in reference now to FIGS. 15 and 16, the support member 28 can include a bulge 218 along the closed bottom end 34.

The bulge 218 can help strengthen the support member 28. Without the bulge 218, the support member wall 30 may need to be thicker than in arrangements that have the bulge 218.

The bulge 218 can be helpful in identifying the correct filter element 40 for assembly in the support member 28. A correct filter element 40 for the support member 28 can include an end cap bulge 220 as part of the closed end cap 54. The end cap bulge 220 can fit within and against an internal surface of the support member bulge 218.

FIG. 16 shows pressure in the form of arrows 222 that will be against the end cap 54. The end cap bulge 220 can be helpful in strengthening the filter element 40 with respect to the pressure 222.

Further examples of bulges that can be used as part of the support member 28 and end cap 54 are shown in FIGS. 23 and 25-27.

Figure 23:
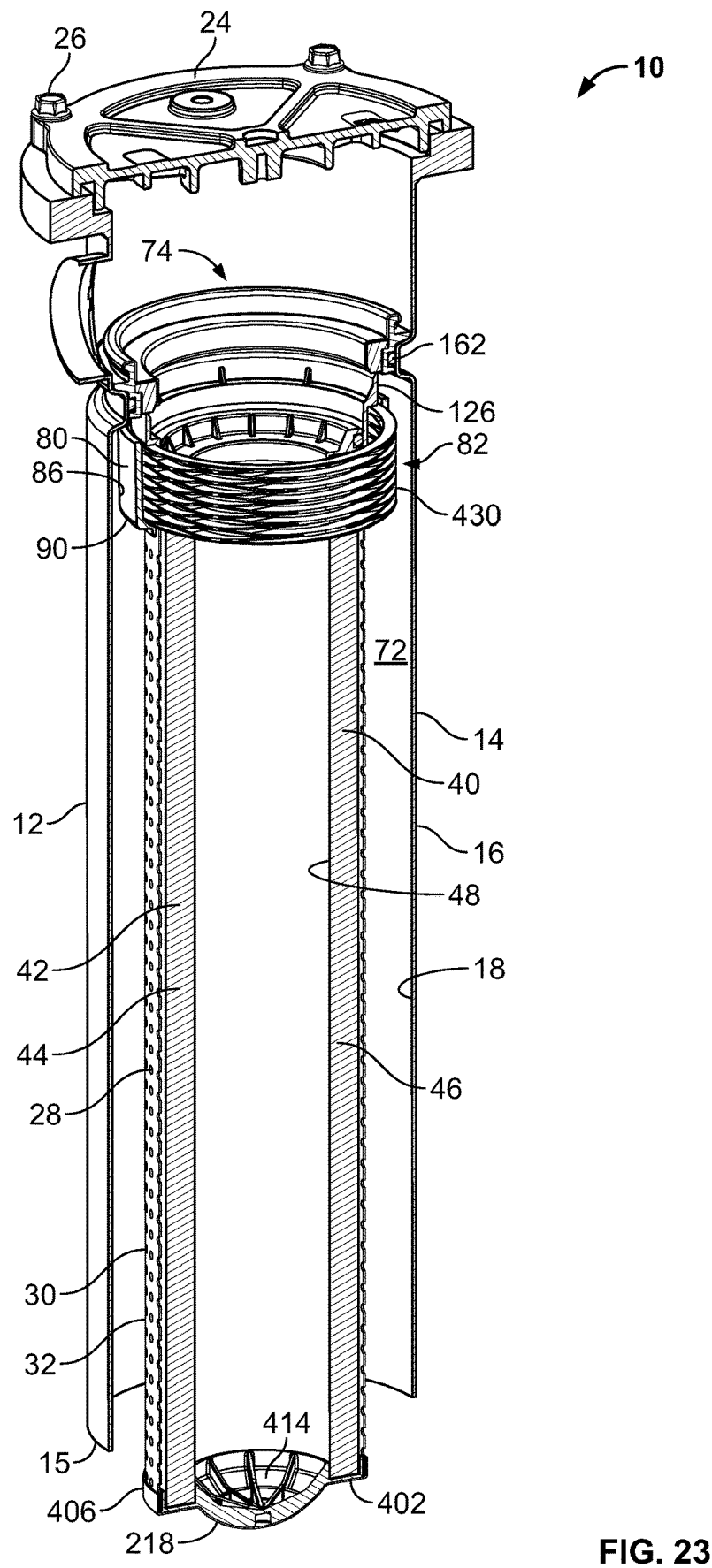
FIG. 23 is a perspective, cross-sectional view of a portion of a liquid filter assembly, constructed in accordance with the principles of this disclosure.

FIG. 23 illustrates liquid filter assembly 10. The filter assembly 10 includes filter element 40 having a bulged closed end cap 402. The assembly 10 in FIG. 23 is analogous to the arrangement of FIGS. 1-4. It should be understood, however, that the element 40 having the bulged closed end cap 402 could also be part of the assembly of FIGS. 5-8.

In FIG. 23, the filter element 40 includes tubular media pack 46 defining media interior 48. The media pack 46 has an opposite first end 404 (FIG. 25) and second end 406. The open end cap 58 (FIG. 25) is secured to the media pack 46 at or near the first end 404.

The bulged closed end cap 402 is secured to the media pack 46 at or near the second end 406.

Figure 25:
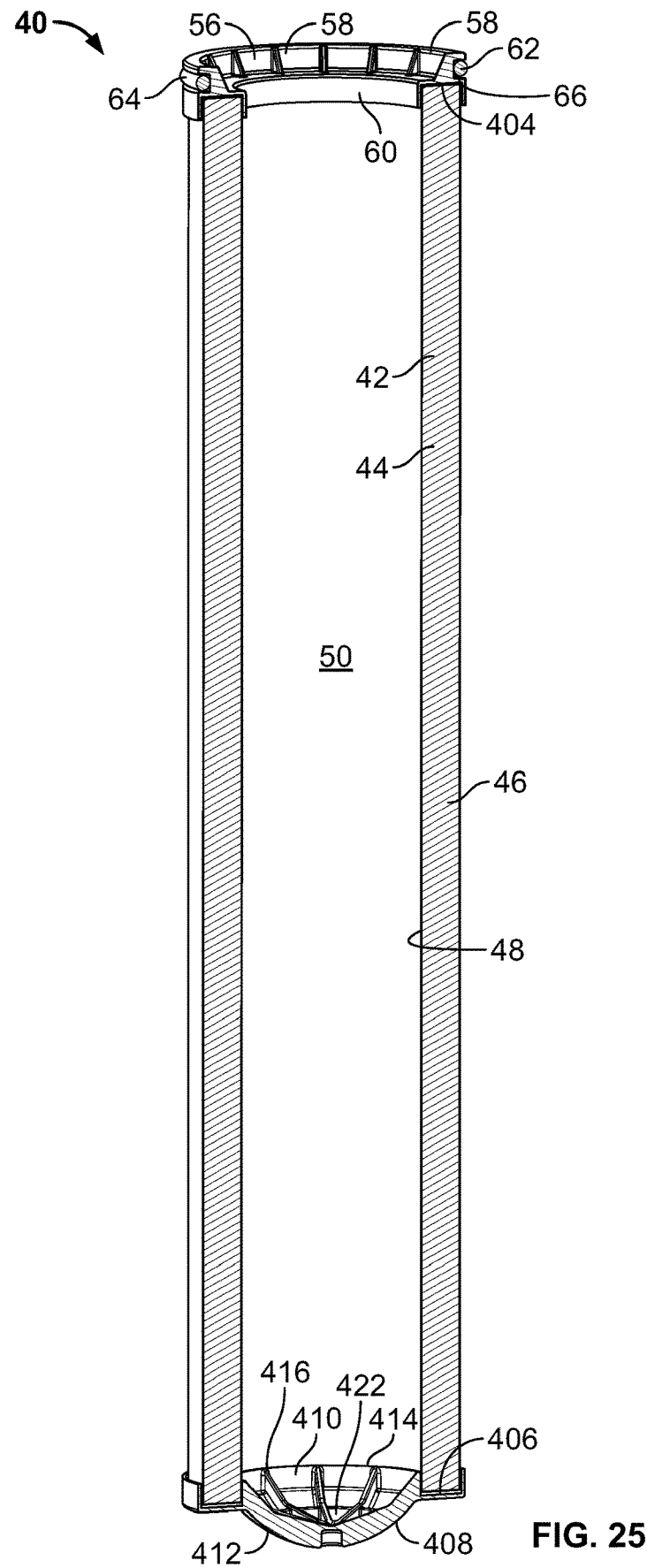
FIG. 25 is a perspective view of a replaceable filter element utilized in the assembly of FIG. 23.
Figure 26:
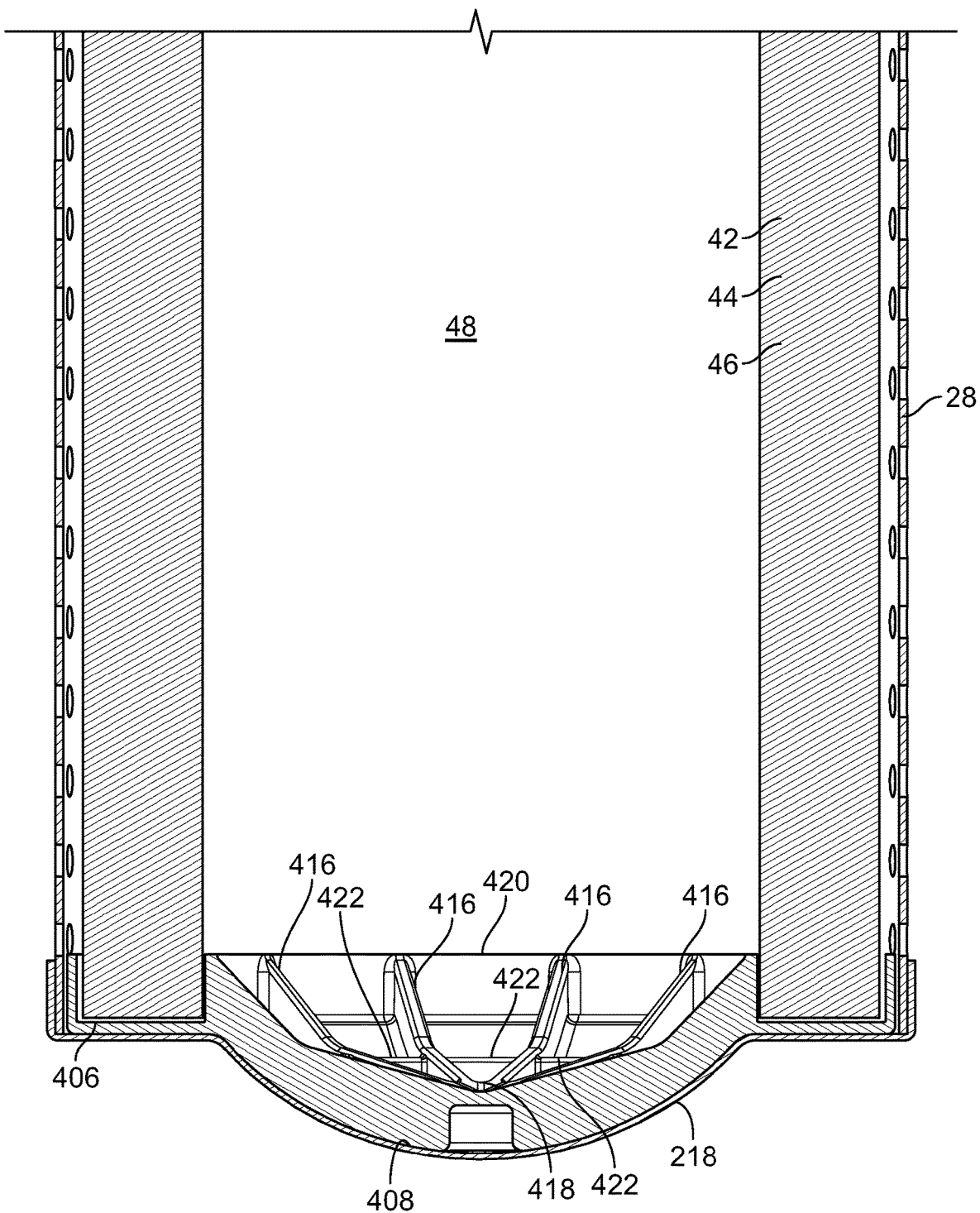
FIG. 26 is a cross-sectional view of a portion of the filter element and support tube of FIG. 23.

Referring now to FIG. 25, the bulged closed end cap 402 includes an exterior portion 408. The exterior portion 408 faces away from a remaining portion of the filter element 40. The exterior portion 408 is not in communication with the media interior 48.

On a portion opposite of the exterior portion 408, the closed end cap 402 has an interior portion 410. The interior portion 410 is in communication with the media interior 48.

The exterior portion 408 defines a bulge 412. The bulge 412 extends away from a remaining portion of the filter element 40. The bulge 412 extends beyond the second end 406 of the media pack 46.

While the bulge 412 is illustrated as extending away from a remaining portion of the filter element 40 to be an outward bulge, it should be understood that the bulge could also extend inwardly and be directed into the media interior 48.

The interior portion 410 of the closed end cap 402, in this embodiment, defines a concave receptacle 414. The concave receptacle 414 provides advantages. When the filter element 40 is operated as an "in-to-out" flow filter, in which unfiltered liquid flows first into the media interior 48 and then flows radially outwardly through the media pack 46, the receptacle 414 can act as a receptacle to receive particulate that cannot pass through the media 40. Because the receptacle 414 is beyond the media 40, and in the embodiment shown in FIG. 25, it is below the second end 406 of the media 46, any particulate matter that is in the receptacle 414 will not block or mask the media 46.

The interior portion 410 of the closed end cap 402 can include structure to strengthen the bulge 412, while still be shaped to form the receptacle 414 for receiving particles. In the example shown in FIGS. 25 and 26, the interior portion 410 of the closed end cap 402 includes a plurality of spaced ribs 416. In this example, the ribs 416 extend radially from a center 418 of the closed end cap 402 to a rim 420. In this non-limiting example, the rim 420 is circumscribed by the inner media pack 46.

In this non-limiting example, the interior portion 410 of the closed end cap 402 may include a plurality of gussets 422. The gussets 422 can extend circumferentially on the interior portion 410. In the example shown, the gussets 422 extend between the ribs 416. Many variations are possible.

Figure 27:
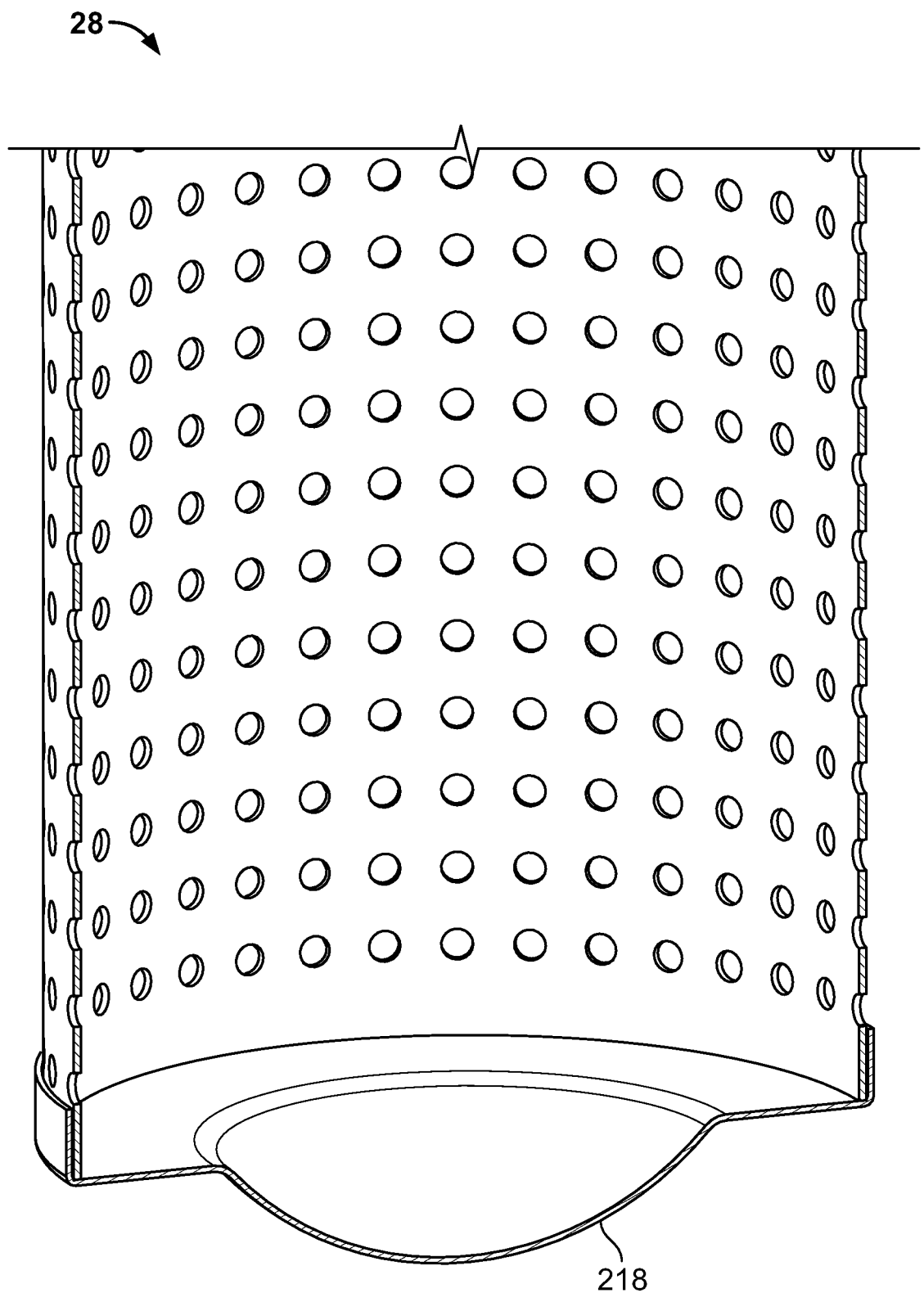
FIG. 27 is a perspective, cross-sectional view of a portion of the support tube utilized in the assembly of FIG. 23.

As with the embodiment of FIG. 1, the filter element 40 can be removed and replaced in the assembly 10, including removing it from the support member 28. FIG. 27 illustrates a perspective, cross-sectional view of a bottom region of the support tube 28 utilized in the assembly of FIG. 23. The support member 28 has bulge 218 along the closed bottom end 34 (FIG. 1). As mentioned above, the bulge 218 helps to strengthen the support member 28. It further helps to support and strengthen the bulged closed end cap 402, such that the receptacle 414 can be used for the collection of particulate or debris.

Figure 24:
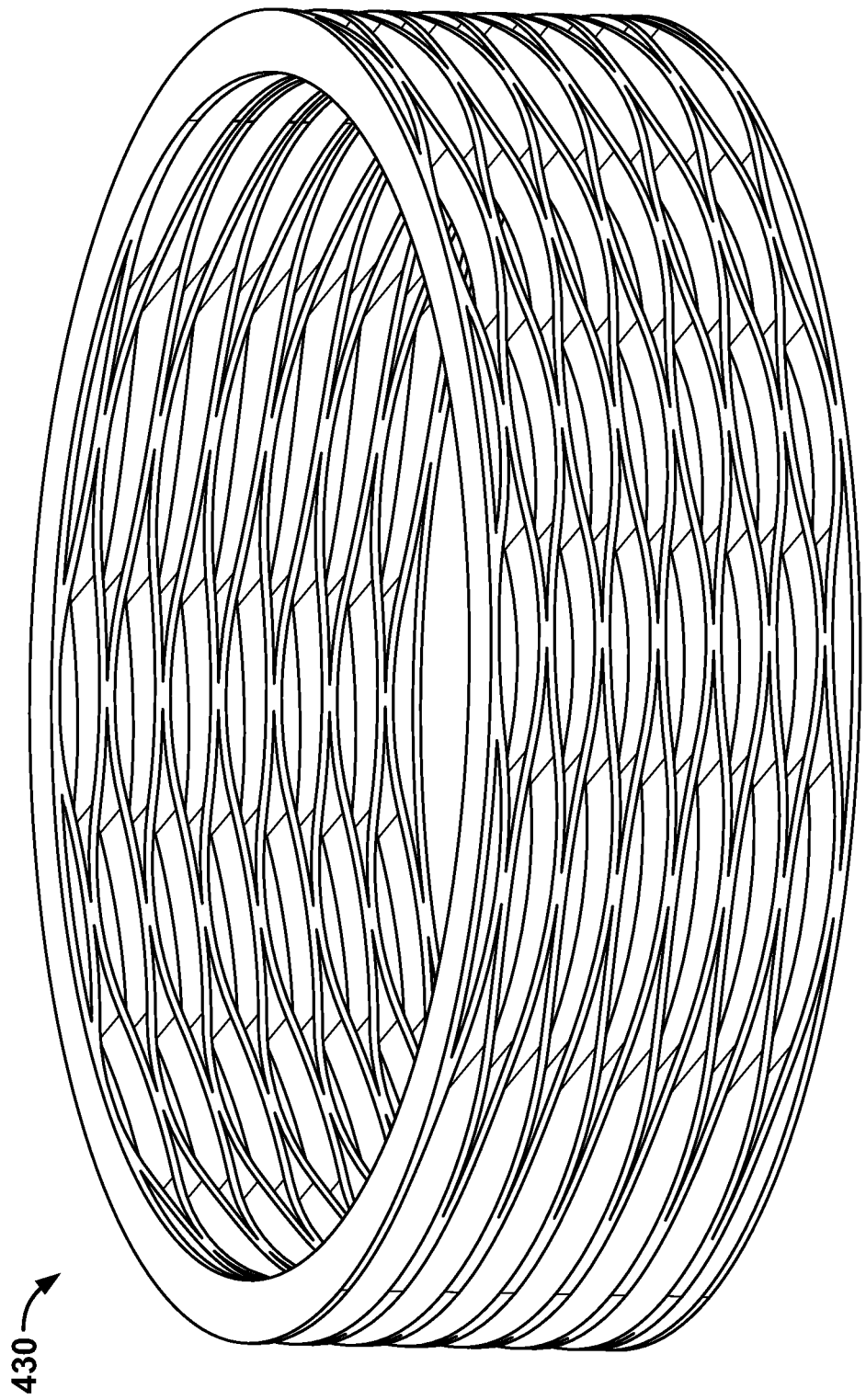
FIG. 24 is a perspective view of a biasing member utilized in the assembly of FIG. 23.

In reference again to FIG. 23, the filter assembly 10 has biasing member 82. In this particular embodiment, the biasing member 82 comprises a wave spring 430 (FIGS. 23 and 24). The wave spring 430 can be used instead of the coiled spring 84, described above. The wave spring 430 can provide increased accuracy of spring force, as compared to a wire spring. Furthermore, the wave spring 430 can provide an increased stiffness for a given area, as compared to a wire spring.

It should be understood that the wave spring 430 is shown used with the assembly 10 of FIG. 23, but the wave spring 430 can be used in any of the previously described embodiments as the biasing member 82.

From the above examples, operation of the liquid filter assembly 10 should be apparent. Unfiltered liquid will be directed into the housing inlet 20 and into the media interior 48. There, it will be part of the unfiltered liquid volume 50.

The method can include filtering the unfiltered liquid by directing the liquid to flow through the media pack 42 and then through the support member 28 to the filtered liquid volume 72. The filtered liquid volume 72 will be outside of the interior volume 32 of the support member 28. From the filtered liquid volume 72, the liquid will be directed through the housing outlet 22.

Independent of the above, when restriction across the media pack 42 reaches a predetermined level, the method can include opening the bypass valve arrangement 74 to permit at least some unfiltered liquid to bypass the media pack 42 and flow into the filtered liquid volume 72 outside of the support member 28. In the method, and independent of the above, the bypass valve arrangement 74 can include bias member seat 80, biasing member 82 operably held by the bias member seat 80, valve head 126 within the bias member seat 80 and engaged against the biasing member 82, and valve seat 128. The valve seat 128 will be in removable sealing engagement with the valve head 126, such that when restriction across the media pack 42 reaches a predetermined level, the valve head 126 is moved out of sealing engagement with the valve seat 128, opening the bypass opening 130 to allow flow of unfiltered liquid into the filtered liquid volume 72.

Independent of the above, in the method, the bias member seat 80 can be attached to the support member 28.

Independent of the above, the bias member seat 80 can be attached to the housing arrangement 12.

Independent of the above, the valve head 126 can include sealing surface 132. The filter element seal member 62 can be sealed against the sealing surface 132.

Independent of the above, the method can include the valve seat 128 being secured to the support member 28.

Independent of the above, the valve seat 128 can be secured to the housing arrangement 12.

Independent of the above, the method can include the filter element 40 having seal member 62 forming seal 68 against the support member 28.

FIGS. 17-22 illustrate another embodiment. A filter assembly 300 is depicted in partial cross-section in FIG. 17. The filter assembly 300 may be used in a variety of implementations. In one non-limiting example, the filter assembly 300 can be used in a return line of a hydraulic fluid system.

Figure 21:
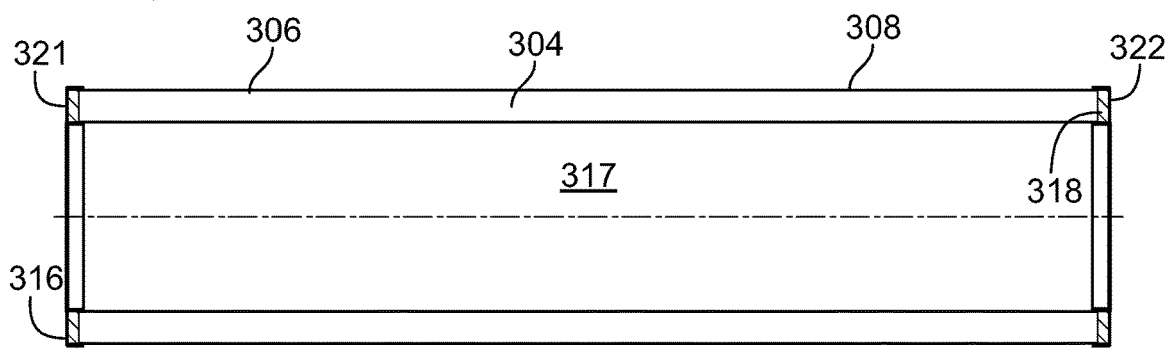
FIG. 21 is a cross-sectional view of the filter element in the filter assembly of FIG. 17, the cross-section being taken along the line 21-21 of FIG. 22.
Figure 22:
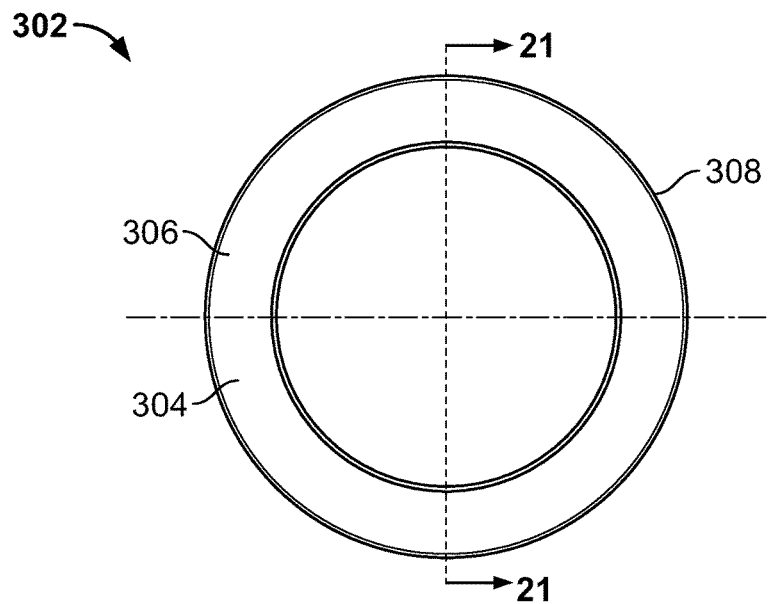
FIG. 22 is an end view of the filter element of FIG. 21.

The filter assembly 300 includes a filter cartridge 302. The filter cartridge 302 can include filter media 304. One example type of filter media 304 usable is pleated media 306 forming a tube 308 (FIGS. 21 and 22). The tube 308 can be oval or round in cross-section. In the example shown in FIG. 22, it is round in cross-section.

The filter cartridge 302 is received within an outer liner 310. The outer liner 310 can be reusable. By reusable, it is meant that when the filter cartridge 302 is replaced, the outer liner 310 is not replaced but is again used with the replacement filter cartridge 302.

Many different materials can be used for the outer liner 310. In a non-limiting example, the outer liner 310 is made from metal.

The filter cartridge 302 and liner 310 can be secured together. In a non-limiting example shown, the filter cartridge 302 and liner 310 are secured together with endpiece 312.

The endpiece 312 can be many types of constructions. In the non-limiting example shown, the endpiece 312 is an open spider casting 314 at a first end 316 of the filter cartridge 302. The open spider casting 314 allows unfiltered fluid to flow into an inner volume 317 of the tube 308 of filter media 304.

In the non-limiting example shown, a second end 318 of the cartridge 302 and opposite of first end 316 is a closed end casting 320. The closed end casting 320 prevents the passage of fluid through the second end 318 of the cartridge 302.

The first end 316 of the filter cartridge 302 includes the filter media 304 sealed or otherwise secured to a first end cap 321. The media 304 can be potted within the first end cap 321 with urethane or other suitable material. The first end cap 321 can be a variety of materials including metal or non-metal. In the non-limiting example shown, the first end cap 321 is metal.

The second end 318 of the filter cartridge 302 includes the filter media 304 sealed or otherwise secured to a second end cap 322. The media 304 can be potted within the second end cap 322 with urethane or other suitable material. The second end cap 322 can be a variety of materials including metal or non-metal. In the non-limiting example shown, the second end cap 322 is metal.

When assembled, the filter cartridge first end cap 321 seals against a grommet 324, which is secured to an end piece 326 attached to the outer liner 310. See FIG. 18.

In the non-limiting example shown, the end piece 326 has a generally U-shaped cross-section with a main section 328 and a pair of arms 330, 332 extending therefrom. The main section 328 can be generally parallel to the first end cap 321. The arm 330 extends next to, along a same direction as (generally parallel to), and radially outside of the outer liner 310. The arm 332 can be generally parallel to the outer liner 310 and arm 330, while being radially inward of and radially spaced from the cartridge 302 including the first end cap 321.

In the non-limiting example shown, the grommet 324 has a radial grommet section 325 oriented to be between and against a radially outwardly facing surface 334 of the arm 332 and an radially inner facing surface 336 of the first end cap 321.

In the non-limiting example shown, the grommet 324 has an axial grommet section 327 oriented between and against the main section 328 of the end piece 326 and an axial portion 338 of the first end cap 321.

Between an outer axial surface 340 of the main section 328 of the end piece 326 and an inner axial surface 342 of a rim 344 of the open spider casting 314 can be a flat gasket 346.

In the non-limiting example shown, the second end 318 of the cartridge 302 seals against a metal end cap 350 provided on the closed end casting 320. A grommet 352 has a radial section 353 oriented between and against an inwardly radial surface 354 of the second end cap 322 and an outwardly radial surface 356 of the end cap 350.

In the non-limiting example shown, the grommet 352 has an axial section 355 oriented between and against an outward axial surface 358 of the second end cap 322 and an inward axial surface 360 of the end cap 350.

In the example shown, the end cap 350 on the closed end casting 320 includes an inwardly protruding section 362, protruding into the inner volume 317 of the tube 308 of filter media 304.

A post 364 is provided that extends through the filter cartridge 302 and castings 314, 320 wherein nuts and springs 366, 368 are used at each end of the post 364 to result in a fully assembled filter assembly. In some optional examples, the post 364 can hold a magnet 370 in the inner volume 317.

In operation, fluid flows into the inner volume 317 of the filter cartridge 302 via the open spider casting 314, is filtered by flowing through the media 304, and then exits the filter cartridge 302.

The above description represents example principles of this disclosure. Many embodiments can be made applying these principles.

What is claimed is:

1. A filter element comprising:
   (a) a tubular media pack defining a media interior and having opposite first and second ends;
   (b) a first open end cap secured to the media pack at the first end; and
   (c) a second closed end cap secured to the media pack at the second end; the second end cap including an exterior portion and an opposite interior portion; the interior portion being in communication with the media interior; the second end cap including an inner rim circumscribed by the media pack;
      (i) the exterior portion of the second end cap having a bulge that extends away from a remaining portion of the filter element and beyond the second end of the media pack;
      (ii) the interior portion of the second end cap including a plurality of spaced ribs extending radially from a center of the second end cap and not extending past the inner rim.

2. A filter element according to claim 1 wherein:
   (a) the interior portion of the second end cap defines a concave receptacle.

3. A filter element according to claim 1 wherein:
   (a) the interior portion of the second end cap includes a plurality of gussets extending circumferentially thereon.

4. A filter element according to claim 1 further comprising:
   (a) a seal member against the first end cap.

5. A filter element according to claim 4 wherein:
   (a) the seal member comprises an o-ring seal member held by the first end cap.

6. A filter element according to claim 5 wherein:
   (a) the media pack has an outside diameter which is less than an outside diameter of the o-ring seal member.

7. A filter element according to claim 5 wherein:
   (a) the media pack has an outside diameter which is greater than an inside diameter of the o-ring seal member.

8. A filter element according to claim 1 wherein:
   (a) the media pack comprises pleated media.

9. A filter element according to claim 1 further comprising:
   (a) a seal member supported by the first end cap; the seal member configured to dynamically seal against a portion of an assembly when the filter element is operably installed within the assembly.

10. A filter element according to claim 9 wherein:
    (a) the seal member comprises an o-ring seal member.

11. A filter element according to claim 10 wherein:
    (a) the media pack has an outside diameter which is less than an outside diameter of the o-ring seal member.

12. A filter element according to claim 11 wherein:
    (a) the media pack has an outside diameter which is greater than an inside diameter of the o-ring seal member.

13. A filter element according to claim 12 wherein:
(a) the interior portion of the second end cap defines a concave receptacle.

* * * * *